United States Patent [19]
Nishio et al.

[11] Patent Number: 5,515,136
[45] Date of Patent: May 7, 1996

[54] IMAGE RECORDING APPARATUS

[75] Inventors: Tomonori Nishio, Kanagawa; Takatoshi Ohtsu, Tokyo; Atsushi Uejima, Kanagawa, all of Japan

[73] Assignee: Fuji Photo Film Co., Ltd., Kanagawa, Japan

[21] Appl. No.: 309,585

[22] Filed: Sep. 21, 1994

[30] Foreign Application Priority Data

| Sep. 21, 1949 | [JP] | Japan | 5-234962 |
| Mar. 10, 1994 | [JP] | Japan | 6-040012 |
| Mar. 10, 1994 | [JP] | Japan | 6-040164 |

[51] Int. Cl.$^6$ .................................................. G03B 27/80
[52] U.S. Cl. .................................. 355/37; 355/1; 355/38; 355/238; 347/238; 347/232
[58] Field of Search ............................... 355/1, 37, 38, 355/238; 346/160

[56] References Cited

U.S. PATENT DOCUMENTS

| 4,951,084 | 8/1990 | Von Stein | 355/38 |
| 5,185,227 | 2/1993 | Yamana et al. | 430/49 |
| 5,272,493 | 12/1993 | Hubble et al. | 346/160 |
| 5,321,429 | 6/1994 | Ono et al. | 346/107 R |
| 5,321,438 | 6/1994 | Melino | 346/157 |
| 5,374,988 | 12/1994 | Wertz et al. | 356/328 |

*Primary Examiner*—Howard B. Blankenship
*Assistant Examiner*—D. P. Malley
*Attorney, Agent, or Firm*—Sughrue, Mion, Zinn, Macpeak & Seas; Richard C. Turner; Steven M. Gruskin

[57] ABSTRACT

An image recording apparatus having a light source which illuminates light to one of a reflection original image and a transparency original image, and an imaging lens system which uses the light reflected or transmitted from the original image after being emitted from the light source to form an image on a photosensitive surface of a photosensitive material. A plurality of light emitting diodes are used as the light source. Accordingly, controlling the current to the diodes allows control of a quantity of light without changing the color. It therefore becomes unnecessary to provide a diaphragm mechanism for the imaging lens system. As a result, the apparatus can be made small.

14 Claims, 12 Drawing Sheets

IMAGE RECORDING APPARATUS

BACKGROUND OF THE INVENTION

1. Field of the Invention

The present invention relates to an image recording apparatus, and particularly to an image recording apparatus in which light from a light source is irradiated onto a reflection original image or transparency original image, the light being used to form an image on a light-sensitive surface of a photosensitive material via an imaging lens system.

2. Description of the Related Art

Conventionally, in order to record a color image directly from a reflection or transparency original onto photosensitive material, for example, a color printing paper or the like, there has been generally used an optical system in which light from a halogen lamp is irradiated onto the reflection or transparency original and the light (i.e., reflected light or transmitted light) is used to form an image on a light-sensitive surface of the color printing paper via an imaging lens system.

However, when a halogen lamp is used as a light source in the above-described optical system, in order to adjust finished density and color balance in accordance with variation of quantity of light from the halogen lamp, it becomes necessary to use a diaphragm for the imaging lens system and provide a filter for color compensation and a mechanism for letting this filter in and out. As a result, there is a limit to miniaturization of an apparatus.

For this reason, there also has been considered a method for restraining variation of quantity of light by using a rare gas fluorescent lamp or the like, as the light source, instead of the halogen lamp. However, with this method, it is difficult to adjust the quantity of light in accordance with the type of original and to obtain a desirable light source having an optimum wavelength. For this reason, it is not suitable to use this method.

SUMMARY OF THE INVENTION

In view of the aforementioned, it is an object of the present invention to provide an image recording apparatus which is small in size and which can create a reliable color image.

Another object of the present invention is to provide an image recording apparatus which suitably and easily records a color image of an even magnification of an original.

A further object of the present invention is to provide an image recording apparatus which has a high color reproducibility of an original with respect to a recorded image.

The first aspect of the present invention is an image recording apparatus comprising: a light source which illuminates light to an original image; and an imaging lens system which uses light from the original image after being emitted from the light source to form an image on a photosensitive surface of a photosensitive material, wherein the light source comprises a plurality of semiconductor elements each emitting light having different central wavelengths.

The second aspect of the present invention is an image recording apparatus comprising: a light source which illuminates light to one of a reflection original image and a transparency original image; and an imaging lens system which uses light reflected from the original image after being emitted from the light source to form an image on a photosensitive surface of a photosensitive material, the light source having a plurality of light emitting diodes each of which emit light of one of a color of red, green and blue.

The third aspect of the present invention is an image recording apparatus in the second aspect of the present invention. In the third aspect, each of the plurality of light emitting diodes is provided so as to be able to adjust a luminance independently on the basis of color balance in a density band of the original image.

The fourth aspect of the present invention is an image recording apparatus in the second or third aspect of the present invention. In the fourth aspect, the plurality of light emitting diodes of each color of red, green and blue have a plurality of kinds of peak wavelengths, and the plurality of light emitting diodes of the respective colors can be selected in accordance with a spectral absorption of pigments of the original image.

The fifth aspect of the present invention is an image recording apparatus in the second or fourth aspect of the present invention. In the fifth aspect, the plurality of light emitting diodes is provided in such a manner that adjacent light emitting diodes have different colors and are arranged in a straight line at regular intervals, and the imaging lens system is formed by a rod lens array.

The sixth aspect of the present invention is an image recording apparatus comprising: a light source which illuminates light to one of a reflection original image and a transparency original image; and an imaging lens system which uses light from the original image after being emitted from the light source to form an image on a photosensitive surface of a photosensitive material, the light source having a plurality of light emitting diodes, each of which emit light of one of a color of red, green, blue and yellow.

The seventh aspect of the present invention is an image recording apparatus in the sixth aspect of the present invention. In the seventh aspect, the plurality of light emitting diodes are respectively provided in such a manner that each light emitting diode of red emits light whose waveband is approximately 620 nm to 700 nm and whose central wavelength is about 660 nm, each light emitting diode of green emits light whose waveband is approximately 500 nm to 580 nm and whose central wavelength is about 540 nm, each light emitting diode of blue emits light whose waveband is approximately 420 nm to 580 nm and whose central wavelength is about 460 nm, and each light emitting diode of yellow emits light whose waveband is approximately 560 nm to 640 nm and whose central wavelength is about 600 nm.

In accordance with the first aspect of the present invention, since the light source is formed by a plurality of semiconductor elements (e.g., light emitting diodes) which respectively emit light of different central wavelengths, the quantity of light can be controlled without easily causing change in color due to controlling of current, and it becomes unnecessary to provide a diaphragm mechanism for the imaging lens system. As a result, the apparatus can be made small.

In accordance with the second aspect of the present invention, since the light emitting diodes are used as the light source, the quantity of light can be controlled without easily causing change in color due to controlling of current, and it becomes unnecessary to provide a diaphragm mechanism for the imaging lens system. As a result, the apparatus can be made small.

In accordance with the third aspect of the present invention, since each of the plurality of light emitting diodes is provided so as to be able to adjust a luminance independently, it becomes easy to adjust the finished density and color balance in accordance with the kind of original image, i.e., the reflection original image or the transparency original image, and it becomes unnecessary to provide a filter for color compensation. As a result, the apparatus can be made small.

In accordance with the fourth aspect of the present invention, since the spectral absorptance of pigments of the original image varies in accordance with the kind of original image, the light emitting diodes are provided so as to be selected in accordance with the kind thereof. For example, the light emitting diode for a positive slide, which emits light of red, has a peak wavelength of 650 nm and the light emitting diode for a negative slide, which emits light of red, has a peak wavelength of 700 nm. Accordingly, when the light emitting diode suitable for the original image is provided and selected, it is possible to easily select the light emitting diodes suitable for the spectral absorption of the original. Further, among the reflection originals, a photographic original and a printed original have different color materials. If the light emitting diodes are provided which have peak wavelengths suitable for these originals, an optimum color image can be obtained.

In accordance with the fifth aspect of the present invention, in the apparatus which is equipped with an exposure section (for scanning and exposing) which scans the photosensitive material on the original plate and which forms an image on the photosensitive material by the imaging lens system, even if the light emitting diodes are used instead of a conventional halogen lamp, the apparatus cannot be made very much smaller because of the need to record an image of an even magnification of the original. Namely, it is necessary to provide a mechanism for scanning a photosensitive material surface on the original plate and a predetermined length of an optical path. Therefore, enough space must be secured. Accordingly, by arranging the light emitting diodes of respective colors in a straight line at regular intervals and using the rod lens array for the imaging lens, the optical path can be shortened so as to record an image of an even magnification.

As the photosensitive material used in the image recording apparatus of the present invention, any type of photosensitive material is applicable which can obtain a visible image by predetermined development processing of a latent image obtained by exposing an image of the original. Examples of such photosensitive material include a conventional color photographic photosensitive material (i.e., negative film, reversal film, color printing paper, or the like), a color diffusion transfer photosensitive material, a color heat-developing photosensitive material, a color photosensitive pressure-sensitive material, and the like.

In accordance with the present invention, at least one of the plurality of light emitting diodes of each color of red, green, blue and yellow are used and light from these light emitting diodes is irradiated onto the original. Here, in the seventh aspect of the present invention, each light emitting diode of red emits light whose waveband is approximately 620 nm to 700 nm and whose central wavelength is about 660 nm, each light emitting diode of green emits light whose waveband is approximately 500 nm to 580 nm and whose central wavelength is about 540 nm, each light emitting diode of blue emits light whose waveband is approximately 420 nm to 580 nm and whose central wavelength is about 460 nm, and each light emitting diode of yellow emits light whose waveband is approximately 560 nm to 640 nm and whose central wavelength is about 600 nm.

In the apparatus for scanning and exposing, when the original is conveyed, or when a light emission system of the light emitting diodes is conveyed, the original is scanned by light irradiated from the light emitting diodes and the light reflected from the original or transmitted through the original is used by the imaging lens system to form an image on the photosensitive surface of the photosensitive material. As a result, the image recorded on the original can be recorded on the photosensitive material.

As described above, at least one of the plurality of light emitting diodes of each color of red, green, blue and yellow are used as the light sources, the light intensity of a wavelength within a predetermined range with 600 nm between green and red as the center reaches a suitable value, so that the color reproducibility of the original improves.

Here, the light emission time and light emitting intensity of each of the plurality of light emitting diodes may be independently adjusted in accordance with the density and color balance of the original image and the kind of photosensitive material. In this case, the density, color balance of the original image, or the like may be obtained by metering by photometry and calculating the original by CCD or the like, or may be determined in a visual manner.

Thus, since the light emission time and light emitting intensity of each of the plurality of light emitting diodes can be independently adjusted in accordance with the density and color balance of the original image and the kind of photosensitive material, a suitable image corresponding to the original can be recorded, and it becomes unnecessary to specially provide a color filter and a diaphragm mechanism. As a result, the apparatus can be made small.

Further, in the above-described image recording apparatus, a plurality of light emitting diodes which emit light of the same color and have different central wavelengths is provided for each color, and any of the plurality of light emitting diodes may be selected for each color in accordance with the spectral absorption characteristics of pigments of the reflection original image or transparency original image.

As described above, since the light emitting diode in accordance with the spectral absorption characteristics of pigments of the original image can be selected, it is possible to improve color reproducibility of the original recorded on the photosensitive material.

In addition, the light emitting diodes of respective colors may be arranged in a straight line along the widthwise direction of the original at regular intervals, and the rod lens array may be used for the above-described imaging lens system.

Since the light emitting diodes of respective colors are arranged in a straight line along the widthwise direction of the original, light in which respective colors are uniformly mixed with each other is evenly illuminated along the widthwise direction of the original, and a suitable image corresponding to the original can be recorded. Further, since the rod lens array, which is a simple optical system, is used, the apparatus can be made even smaller.

As described above, the image recording apparatus according to the present invention results in the effects of being smaller and forming a color image of high reliability.

Further, it also results in the effects of suitably and easily recording a color image of an even magnification.

DESCRIPTION OF THE PREFERRED EMBODIMENTS

Figure 1:
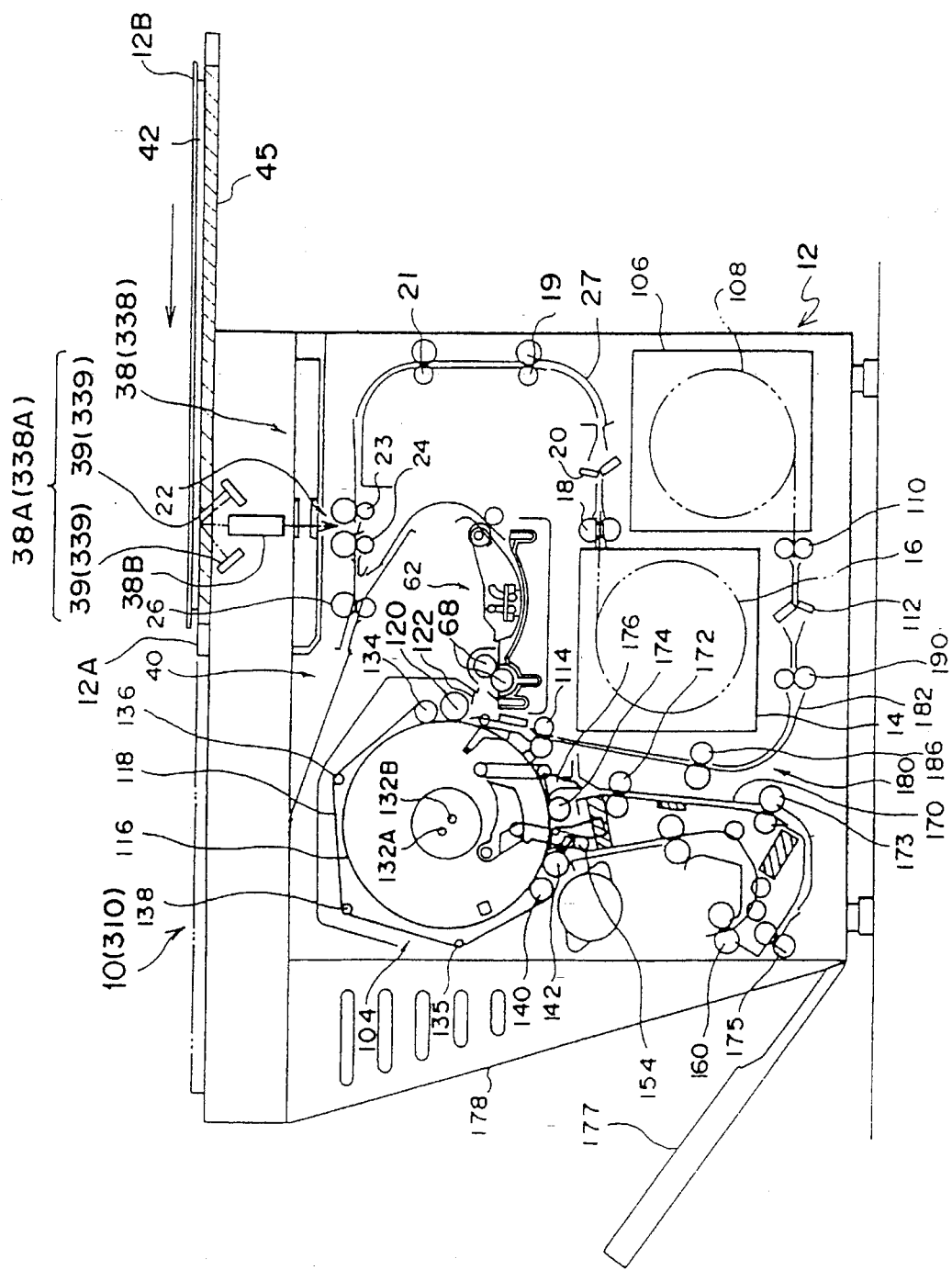
FIG. 1 is a schematic view of an image recording apparatus (for scanning and exposing) according to first and sixth embodiments of the present invention.

FIG. 1 shows a schematic overall structural view of an image recording apparatus 10 according to a first embodiment of the present invention.

The first embodiment represents an apparatus which exposes an image onto a heat-developing photosensitive material and transfers the exposed image to an image receiving material by heat development. First, a heat-developing photosensitive material which can be used in the present embodiment will be described in detail.

As shown in FIG. 1, a heat-developing photosensitive material (which will be hereinafter referred to as a heat-developing photosensitive material or a photosensitive material) used in the present embodiment includes, basically, photosensitive silver halide and binder on a base body. Further, as the need arises, it may contain organometallic salt oxidizer, pigment supplying compounds (as will be described below, a reducing agent may serve as the pigment supplying compounds), or the like.

These components are often applied to the same layer, but if they are in a state of being capable of reacting, they may be respectively applied to separate layers. For example, when colored pigment applying compounds exist in a lower layer of silver halide emulsion, it prevents deterioration of sensitivity of the silver halide emulsion. A reducing agent is preferably contained in the heat-developing photosensitive material. However, the reducing agent also may be supplied from outside, for example, by causing the reducing agent to diffuse from a pigment fixing element which will be described below.

In order to obtain a wide range of colors within a chromaticity diagram by using three primary colors of yellow, magenta and cyan, at least three silver halide emulsion layers respectively having photosensitivity in different spectral regions are combined with each other. For example, a three-layer combination of a blue sensitive layer, a green sensitive layer and a red sensitive layer, a combination of a green sensitive layer, a red sensitive layer and an infrared light-sensitive layer, and a combination of a red sensitive layer, an infrared light-sensitive layer (I) and an infrared light-sensitive layer (II) are respectively described in Japanese Patent Application Laid-Open Nos. 59-180550, 64-13546, 62-253159, European Patent Application Laid-Open No. 479,167, and the like. Each of the light-sensitive layers can be disposed in accordance with various arrangement orders which are well known in an ordinary color photosensitive material. Further, each of these light-sensitive layers may be divided into two or more layers when necessary, as described, for example, in Japanese Patent Application No. 1-252954.

In the heat-developing photosensitive material, each type of non photo-sensitive layer such as a protective layer, undercoat layer, intermediate layer, yellow filter layer or anti-halation layer may be provided between the above-described silver halide emulsion layers and in the uppermost layer and the lowermost layer. Further, various auxiliary layers such as a backing layer can be formed on a side opposite to a base body. Concretely, various types of combinations of layers as described in the above-described patent applications, an undercoat layer described, for example, in U.S. Pat. No. 5,051,335, an intermediate layer containing solid pigments described, for example, in Japanese Patent Application Laid-Open Nos. 1-167838 and 61-20943, an intermediate layer having a reducing agent and DIR compounds described, for example, in Japanese Patent Application Laid-Open Nos. 1-120553, 5-34884 and 2-64634, an intermediate layer having an electron transfer agent described, for example, in U.S. Pat. Nos. 5,017,454 and 5,139,919 and Japanese Patent Application Laid-Open No. 2- 235044, a protective layer having a reducing agent described, for example, in Japanese Patent Application Laid-Open No. 4-249245, or any combination of these layers can be provided.

When the base body is a polyethylene laminated paper containing white pigments such as titanium oxide, a backing layer is preferably formed such as to have an anti-static function and a surface resistivity of $10^{12} \Omega/cm$ or less.

The silver halide which can be used in the heat-developing photosensitive material of the present embodiment may be any one of silver chloride, silver bromide, silver iodobromide, silver chlorobromide, silver chloroiodide and silver iodo-chlorobromide.

The silver halide emulsion used for the heat-developing photosensitive material of the present embodiment may be a surface latent image-type emulsion or an internal latent image-type emulsion. The internal latent image-type emulsion is combined with a nucleating agent or light fogging agent so as to be used as a direct-inversion emulsion. Further, a so-called core-shell emulsion also may be used, in which an inner part of each grain differs from a surface layer thereof in the phase of silver halide. Moreover, silver halide having a different composition may be joined to the emulsion by epitaxial junction. The silver halide emulsion may have a monodisperse emulsion or a polydispersed emulsion.

A method of mixing a monodisperse emulsion so as to adjust gradation is preferably used as described in Japanese Patent Application Laid-Open Nos. 1- 167743 and 4-223463. The grain size is preferably 0.1 to 2 μm, particularly, 0.2 to 1.5 μm. The crystal habit of the silver halide grains may take any shape. For example, grains each having a regular crystal shape such as a cubic shape, octahedron, or fourteen-faced solid, grains each having an irregular crystal shape such as a sphere and a flat plate having a high aspect ratio, or grains each having crystal defect such as a twin plane, or grains having a combination of the above-described crystal shapes may be used.

Concretely, any one of silver halide emulsions can be used which are prepared by using respective methods described, for example, in U.S. Pat. No. 4,500,626, fiftieth column, U.S. Pat. No. 4,628,021, Research Disclosure (which will be hereinafter referred to as RD) No. 17,029 (1978), No. 17,643 (December 1987), pages 22 and 23, No. 18,716 (November 1979), page 648, No. 307,105 (November 1989), pages 863 to 865, Japanese Patent Application Laid-Open Nos. 62-253159, 64-13546, 2-236546, 3-110555, "Chemie et Phisique Photographique" (by P. Glafkides, Paul Montel, 1967), "Photographic Emulsion Chemistry" (by G. F. Duffin, Focal Press, 1966), "Making and Coating Photographic Emulsion" (by V. L. Zelikman et al., Focal Press, 1964).

In a process of preparing the light-sensitive silver halide silver emulsion for the heat-developing photosensitive material of the present embodiment, a so-called demineralization which removes excessive saline is preferably effected. As the means for demineralization, a noodle washing process may be used which effects demineralization by gelatin being gelled. Further, a precipitation technique utilizing inorganic saline comprised of polyatomic anion (for example, sodium sulfate), an anionic surface active agent, anionic polymer (for example, polyethylene sodium sulfonate), or gelatin derivatives (for example, aliphatic gelatin acylate, aromatic gelatin acylate, aromatic carbamoyl gelatin) also may be used. In this case, preferably, the precipitation technique is used.

The light-sensitive silver halide emulsion used for the heat-developing photosensitive material of the present embodiment may contain heavy metal such as iridium, rhodium, platinum, cadmium, zinc, lead, iron or osmium for various purposes. These compounds may be used independently, or two or more kinds of compounds may also be combined with each other. The amount added of the compounds varies in accordance with the type of purposes for which they are used. Generally, the amount added is approximately $10^{-9}$ to $10^{-3}$ per 1 mol of silver halide in the emulsion. Further, these compounds may be uniformly contained in grains of the emulsion, or also may be contained in such a manner as to exist in an inner part or a surface of each grain. Concretely, emulsions described, for example, in Japanese Patent Application Laid-Open Nos. 2-236542, 1-116637 and 5- 181246 are preferably used.

In a process of forming grains of the light-sensitive silver halide emulsion for the heat-developing photosensitive material of the present embodiment, salt rhodanate, ammonia, 4-substituted thioether compounds, organic thioether derivatives described in Japanese Patent Publication No. 47-11386, or sulfur-containing compounds described in Japanese Patent Application Laid-Open No. 53-144319 can be used as silver halide solvent.

Other conditions may be referred to "Chemie et Phisique Photographique" (by P. Glafkides, Paul Montel, 1967), "Photographic Emulsion Chemistry" (by G. F. Duffin, Focal Press, 1966), "Making and Coating Photographic Emulsion" (by V. L. Zelikman et al., Focal Press, 1964) or the like. Namely, any one of an oxidation process, neutral process and ammonia process may be used. Further, in order to cause soluble silver salt and soluble halogen salt to react on each other, any one of a one-side mixing method, a simultaneous mixing method, and a combination of them may be used. In order to obtain a monodisperse emulsion, the simultaneous mixing method is preferably used.

Also, an inverse mixing method in which grains are formed under the influence of excessive silver ions, may be used. Further, a so-called control double jet technique, in which pAg within a liquid phase where silver halide is formed is maintained at a fixed value, also may be used as one of simultaneous mixing methods.

Further, densities, amounts added and flow velocities of silver salt and halogen salt both of which are to be added in order to facilitate grain growth may be increased (see Japanese Patent Application Laid-Open Nos. 55-142329 and 55-158124, U.S. Pat. No. 3,650,757 and the like).

In addition, as a method of stirring a reactive solution, any of well-known stirring methods may be used. Further, the temperature and pH value of the reactive solution during formation of the silver halide grains may be respectively set at any values in accordance with each purpose. The pH is preferably set in a range of 2.2 to 7.0 more preferably 2.5 to 6.0.

The light-sensitive silver halide emulsion is a chemically-sensitized silver halide emulsion. In order to effect chemical sensitization of the light-sensitive silver halide emulsion for the heat-developing photosensitive material of the present embodiment, a well-known method, for example, a chalcogen sensitization method such as sulfur sensitization method, selenium sensitization method or tellurium sensitization method, a precious metal sensitization method using gold, platinum, palladium or the like, and a reduction sensitization method can be used independently or in combinations, for an ordinary photosensitive material emulsion (see, for example, Japanese Patent Application Laid-Open No. 3-110555 and Japanese Patent Application Laid-Open No. 5-241267). These chemical sensitization also can be effected under the presence of nitrogen-containing heterocyclic compounds (see Japanese Patent Application Laid-Open No. 62-253159). Further, an anti-fogging agent described below can be added to the emulsion after chemical sensitization is completed. Concretely, respective methods described in Japanese Patent Application Laid-Open Nos. 5-45833 and 62-40446 can be used.

The pH value during the chemical sensitization is preferably 5.3 to 10.5 more preferably 5.5 to 8.5. The pAg value is preferably 6.0 to 10.5 more preferably 6.8 to 9.0.

The amount applied of the light-sensitive silver halide, which is used for the heat-developing photosensitive material of the present embodiment is set in a range of 1 mg to 10 g/m$^2$ in terms of silver.

In order that the light-sensitive silver halide used for the heat-developing photosensitive material of the present embodiment may have color sensitivity such as green sensitivity, red sensitivity and infrared sensitivity, the light-sensitive silver halide is subject to spectral sensitization by methine dyes and others. Further, a blue sensitive emulsion may be subject to spectral sensitization of a blue color region when necessary.

The dyes to be used herein includes cyanine dye, merocyanine dye, composite cyanine dye, composite merocyanine dye, holopolarcyanines, hemicyanine dye, styryl dye and hemioxonoles.

Concretely, sensitizing dyes described, for example, in U.S. Pat. No. 4,617,257, Japanese Patent Application Laid-Open Nos. 59-180550, 64-13546, 5-45828 and 5-45834, are shown.

These sensitizing dyes may be used independently or in combinations. The combination of sensitizing dyes is often used for the purpose of supersensitization or wavelength adjustment of spectral sensitivity.

In addition to the sensitizing dyes, compounds which substantially do not absorb dyes or visible light, having no function of spectral sensitization by themselves, and which exhibit supersensitization, may be contained in the emulsion (see, for example, U.S. Pat. No. 3,615,641 and Japanese Patent Application Laid-Open No. 63-23145).

A process of adding these sensitizing dyes to the emulsion may be performed during chemical aging, or before or after the chemical aging. Further, this process also may be performed before or after nucleation of silver halide grains as described in U.S. Pat. Nos. 4,183,756 and 4,225,666. Further, these sensitizing dyes or super sensitizers may be added with any one of organic solvent such as methanol, dispersing materials such as gelatin, and a surface-active agent. Generally, the amount added is approximately $10^{-8}$ to $10^{-2}$ per 1 mol of silver halide.

The additives used in the above-described processes and well-known photographic additives which can be used for the heat-developing photosensitive material of the present embodiment are described in the above-described RD Nos. 17,643, 18,716 and 307,105, and the related portions are described below.

TABLE 1

| Type of Additive | RD1764 | RD18716 | RD307105 |
| --- | --- | --- | --- |
| 1. Chemical sensitizer | page 23 | page 648 right col. | page 866 |
| 2. Sensitizing agent | | page 648 right col. | |
| 3. Spectral sensitizer, Super sensitizer | pages 23 and 24 | page 648, right col. to page 649 right col. | pages 866 to 868 |
| 4. Brighteners | page 24 | page 648 right col. | page 866 |
| 5. Antifoggant, Stabilizer | pages 24 and 25 | page 649 right col. | pages 868 to 870 |
| 6. Light absorbent, Filter dye ultraviolet ray absorbent | pages 25 and 26 | page 649 right col. to page 650 right col. | page 873 |
| 7. Dye image stabilizer | page 25 | page 650 right col. | page 872 |
| 8. Hardening agent | page 26 | page 651 left col. | pages 874 and 875 |
| 9. Binder | page 26 | page 651 left col. | pages 873 and 874 |
| 10. Plasticizer, Lubricant | page 27 | page 650 right col. | page 876 |
| 11. Coating aid, Surface active agent | pages 26 and 27 | page 650 right col. | pages 875 and 876 |
| 12. Static inhibitor | page 27 | page 650 right col. | pages 876 and 877 |
| 13. Mat material | — | — | pages 878 and 879 |

As a binder of component layers of a heat-developing photosensitive material and a pigment fixing element, a hydrophilic binder is preferably used. As an example of hydrophilic binder, those described in the above-described RD and Japanese Patent Application Laid-Open No. 64-13546, pages 71 to 75, are included. Concretely, a transparent or semi-transparent hydrophilic binder is preferable. Examples of gelatin, protein such as gelatin derivatives, or a cellulose derivatives, natural compounds such as starch, gum arabic, dextran, polysaccharides such as pullulan, and synthetic polymer compounds such as polyvinyl alcohol, polyvinyl pyrrolidone and acrylic amide polymer are included. Further, a high absorption polymer described, for example, in U.S. Pat. No. 4,960,681 and Japanese Patent Application Laid-Open No. 62-245260, namely, homopolymer of vinyl monomer having —COOM or —$SO_3M$ (M means hydrogen atom or alkali metal), or copolymer comprised of the same kind of vinyl monomers or comprised of the different kinds of vinyl monomers (for example, sodium methacrylate, ammonium methacrylate, and Sumikagel L-5H manufactured by Sumitomo Chemical Co., Ltd.) also may be used. These binders may be used in such a manner that two or more kinds thereof are combined with each other. Particularly, the combination of gelatin and any of the above-described binders are preferable. Further, it suffices that gelatin is selected from any one of lime-treatment gelatin, acid-treatment gelatin and a so-called deliming gelatin in which the content of calcium is reduced. Further, more than one of the above-described gelatins may preferably be used in combination.

When a system which effects heat-development processing by providing a very small quantity of water is employed, by using the above-described high water-absorption polymer, water can be rapidly absorbed. Further, when the high water-absorption polymer is used for a pigment fixing layer or a protective layer, it is possible to prevent a pigment from being retransferred from the pigment fixing element to others after transfer.

In a case of the heat-developing photosensitive material of the present embodiment, the amount used for coating of the binders is preferably less than or equal to 20 g/m², particularly less than or equal to 10 g/m², and more suitably less than or equal to 7 g/m².

With the heat-developing photosensitive material of the present embodiment, organometallic salt serving as an oxidizer is used together with the light-sensitive silver halide. Among these organometallic salts, organic silver salt is particularly preferable.

As an organic compound which can be used to form the above-described organic silver salt oxidizer, benzotriazols, fatty acid and other components described, for example, in U.S. Pat. No. 4,500,626, columns from 52 to 53, are included. Further, silver acetylide described in U.S. Pat. No. 4,775,613 also may be useful. Two or more kinds of organic silver salts may be used.

The above-described organic silver salts can be each used by the amount of 0.01 to 10 mols per 1 mol of the light-sensitive silver halide, preferably 0.01 to 1 mol. The total amount used for coating of the light-sensitive silver halide and organic silver salt is 0.05 to 10 g/m² in terms of silver, suitably 0.1 to 4 g/m².

As a reducing agent used for the heat-developing photosensitive material of the present embodiment, any of well-known reducing agents in the field of heat-developing photosensitive materials can be used. Further, a pigment applying compound having reducibility, which will be described below, is also included (in this case, the other reducing agents can be used together therewith). Further, a reducing-agent precursor may also be used which does not have reducibility by itself, but which designates reducibility by a nucleophilic reagent and by the effect of heat during a development process.

As the reducing agent used for the heat-developing photosensitive material of the present embodiment, there have been shown examples of reducing agents or reducing-agent precursors described in U.S. Pat. No. 4,500,626, columns 49 to 50, U.S. Pat. Nos. 4,839,272, 4,330,617, 4,590,152, 5,017,454 and 5,139,919, Japanese Patent Application Laid-Open Nos. 60-140335, pages 17 and 18, 57-40245, 56-138736, 59-178458, 59-53831, 59-182449, 59-182450, 60-119555, 60-128436, 60-128439, 60-198540, 60-181742, 61-259253, 62-244044, 62-131253, 62-131256, 64-13546, pages 40 to 57, 1-120553, European Patent Application Laid-Open No. 220746A2, pages 78 to 96, and the like.

Further, a combination of various types of reducing agents described in U.S. Pat. No. 3,039,869 also may be used.

When a nondiffusive reducing agent is used, in order to facilitate electron transfer between the nondiffusive reducing agent and a developable silver halide, the nondiffusive reducing agent can be used with a combination of an electron transfer agent and/or an electron transfer agent-precursor when necessary. Particularly, the respective reducing agents described in the above-described U.S. Pat. No. 5,139,919 and European Patent Application Laid-Open No. 418,743 are preferably used. Further, a method of introducing the reducing agent into layers in a stable manner is preferably used as described in Japanese Patent Application Laid-Open Nos. 2-230143 and 2-235044.

The electron transfer agent and the precursor thereof can be selected from the above-described reducing agents or precursors thereof. The mobility of the electron transfer agent or the precursor thereof is desirably larger than that of the nondiffusive reducing agent (i.e., electron donor). Particularly, an effective electron transfer agent is 1-phenyl-3-pyrazolidons or aminophenols.

As the nondiffusive reducing agent (i.e., electron donor) to be used in combination with the electron transfer agent, any reducing agent which substantially does not move within the photosensitive material layer is available in the above-described reducing agents. Preferably, hydroquinones, sulfonamide phenols, sulfonamide naphthols, compounds which serve as electron donors, described in Japanese Patent Application Laid-Open No. 53-110827 and U.S. Pat. Nos. 5,032,487, 5,026,636 and 4,839,272, pigment applying compounds having nondiffusibility and reducibility, which will be described below, or the like are included.

Further, an electron-donor precursor as described in Japanese Patent Application Laid-Open No. 3-160443 is also preferably used.

In addition, the above-described reducing agents can be used in the intermediate layer or protective layer for various purposes, e.g., in order to prevent mixing and improve color reproduction. Concretely, the reducing agents described in European Patent Application Laid-Open Nos. 524,649 and 357,040, Japanese Patent Application laid-Open Nos. 4-249245, 2-46450 and 63-186240. Further, reducing-agent compounds which emit development restrainer described, for example, in Japanese Patent Publication No. 3-63733, Japanese Patent Application Laid-Open Nos. 1-150135, 2-46450, 2-64634 and 3-43735, and European Patent Application Laid-Open No. 451,833 also may be used.

In the case of the heat-developing photosensitive material of the present embodiment, the total amount added of the reducing agents is 0.01 to 20 mols per 1 mol of silver preferably 0.1 to 10 mols.

In the heat-developing photosensitive material of the present embodiment, silver can be used as an image forming material. Further, when silver ion is reduced to silver under a high temperature condition, compounds which correspond or reversely correspond to this reaction so as to generate or discharge mobile pigments, namely, pigment applying compounds, may be contained.

An example of pigment applying compounds which can be used for the heat-developing photosensitive material of the present embodiment is a compound (i.e., coupler) which forms pigments by oxidation-coupling reaction. This coupler may be any of a four-equivalent coupler and a two-equivalent coupler. Further, a two-equivalent coupler which has a nondiffusive group in an elimination group and forms diffusive pigments by oxidation-coupling reaction, also may be preferable. This nondiffusive group may form a polymer chain structure. The concrete examples of color developing agents and couplers are further described in "Theory of the Photographic Process" (by T. H. James, 4th edition, pages 291 to 334 and 354 to 361), RD-No. 307105 (page 871), Japanese Patent Application Laid-Open Nos. 58-123533, 58-149046, 58-149047, 59-111148, 59-124399, 59-174835, 59-231539, 59-231540, 60-2950, 60-2951, 60-14242, 60-23474 and 60-66249, or the like.

Further, an example of another type of pigment applying compounds is compounds which a function of discharging or diffusing diffusive pigments on an image. These types of compounds can be expressed by the following formula [LI].

$$((Dye)\ m–Y)n–Z \qquad [LI]$$

Where, Dye represent a pigment group, namely, a temporarily-shortwaved pigment group or a pigment precursor group; Y represents simple coupling or a linkage group; Z represents a group having a nature which corresponds or reversely corresponds to light-sensitive silver salt having a latent image on an image so as to make a subtracter of the diffusibility of the compounds expressed by ((Dye) m–Y) n –Z, or which emits (Dye) m–Y so as to make the difference in diffusion between the emitted (Dye) m–Y and ((Dye) m–Y) n –Z; m represents an integer of 1 to 5; and n represents 1 or 2. When m and n are both not 1, a plurality of Dyes may be the same pigment group or different from each other.

Examples of pigment applying compounds expressed by the formula [LI] include the following compounds (1) to (5). It should be noted that compounds (1) to (3) each reversely corresponds to development of silver halide and forms a diffusive pigment image (i.e., a positive pigment image), and compounds (4) and (5) each corresponds to development of silver halide and forms a diffusive pigment image (i.e., a negative pigment image).

(1) A pigment developing agent in which a hydroquinone developing agent and pigment components are coupled with each other, is described, for example, in U.S. Pat. Nos. 3,134,764, 3,362,819, 3,597,200, 3,544,545, 3,482,972 and Japanese Patent Publication No. 3-68387. This pigment developing agent is diffusive under alkaline environment, but when it reacts to silver halide, it exhibits nondiffusibility.

(2) As described, for example, in U.S. Pat. No. 4,503,137, nondiffusive compounds also may be used which emit diffusive pigments under alkaline environment and lose diffusibility when they react to silver halide. Examples thereof include compounds which emit diffusive pigments by intramolecular nucleophilic substitution reaction, described, for example, in U.S. Pat. No. 3,980,479, and compounds which emit diffusive pigments by intramolecular ring-forming or opening reaction of an iso-oxazolone ring, described, for example, in U.S. Pat. No. 4,199,354, and the like.

(3) As described, for example, in U.S. Pat. No. 4,559,290, European Patent No. 220,746 A2, U.S. Pat. No. 4,783,396, Journal of Technical Disclosure (issued by Japan Institute of Invention and Innovation) No. 87-6199, and Japanese Patent Application Laid-Open No. 64-13546, nondiffusive compounds which react to a reducing agent which remains without being oxidized by development so as to emit diffusive pigments may be used.

Examples thereof include compounds which emit diffusive pigments by intramolecular nucleophilic substitution reaction after reduction, described, for example, in U.S. Pat. Nos. 4,139,389 and 4,139,379, and Japanese Patent Application Laid-Open Nos. 59-185333 and 57-84453, compounds which emit diffusive pigments by intramolecular electron transfer reaction after reduction, described, for example, in U.S. Pat. No. 4,232,107, Japanese Patent Application Laid-Open Nos. 59-101649 and 61-88257, RD24025 (1984), compounds which emit diffusive pigments by cleavage of single chemical bonding after reduction, described, for example, in West German Patent No. 3,008,588 A, Japanese Patent Application Laid-Open No. 56-142530, U.S. Pat. Nos. 4,343,893 and 4,619,884, nitro compounds which emit diffusive pigments after acceptance of electron, described in U.S. Pat. No. 4,450,223 or the like, compounds which emit diffusive pigments after acceptance of electron, described in U.S. Pat. No. 4,609,610 and the like.

Further, more preferable examples are compounds having a N—X bonding (X designates oxygen, sulfur, or nitrogen) and an electron-attracting group within one molecule, described, for example, in European Patent No. 220,746 A2, Journal of Technical Disclosure No. 87-6199, U.S. Pat. No. 4,783,396, Japanese Patent Application Laid-Open Nos. 63-201653, 63-201654 and 64-13546, compounds having a $SO_2$—X (X designates the same as above) and an electron-attracting group within one molecule, described in Japanese Patent Application Laid-Open No. 1-26842, compounds having a PO—X bonding (X designates the same as above) and an electron-attracting group within one molecule, described in Japanese Patent Application Laid-Open No. 63-271344, and compounds having C—X' bonding (X' designates the same as X, or designates —$SO_2$—) and electron-withdrawing group within one molecule. Further, compounds in which cleavage of single chemical bonding occurs by π bonding which conjugates an electron-accepting group after reduction and diffusive pigments are emitted, described in Japanese Patent Application Laid-Open Nos. 1-161237 and 1-161342, also may be used.

Among the above-described compounds, the compounds having the N—X bonding and electron-attracting group within one molecule are particularly preferable. The concrete examples thereof include respective compounds (1) to (3), (7) to (10), (12), (13), (15), (23) to (26), (31), (32), (35), (36), (40), (41), (44), (53) to (59), (64) and (70) described in European Patent No. 220,746 A2 or U.S. Pat. No. 4,783,396, respective compounds (11) to (23) described in Journal of Technical Disclosure No. 87-6199, and respective compounds (1) to (84) described in Japanese Patent Application Laid-Open No. 64-13546, or the like.

(4) Compounds which are a coupler having diffusive pigments in an elimination group and which discharge diffusive pigments by reacting on an oxidation material of a reducing agent (DDR coupler). Concretely, such compounds are described, for example, in British Patent No. 1,330,524, Japanese Patent Publication No. 48-39165, U.S. Pat. Nos. 3,443,940, 4,474,867 and 4,483,914.

(5) Compounds which have reducibility to silver halide or organic silver salt and emit diffusive pigments by reducing silver halide or organic silver salt (DRR compounds). Since these compounds do not need to use other reducing agents, there is no drawback in that an image is contaminated by oxidation decomposition matters of the reducing agent. The typical example thereof is described, for example, in U.S. Pat. Nos. 3,928,312, 4,053,312, 4,055,428 and 4,336,322, Japanese Patent Application Laid-Open Nos. 59-65839, 59-69839, 53-3819 and 51-104343, RD No. 17465, U.S. Pat. Nos. 3,725,062, 3,728,113 and 3,443,939, and Japanese Patent Application Laid-Open Nos. 58-116537 and 57-179840, U.S. Pat. No. 4,500,626, and the like. A concrete example of DRR compounds can be referred to compounds described in the above-described U.S. Pat. 4,500,626, columns 22 to 44, and particularly, respective compounds (1) to (3), (10) to (13), (16) to (19), (28) to (30), (33) to (35), (38) to (40), and (42) to (64) described therein are preferable. Further, compounds described in U.S. Pat. No. 4,639,408, columns 37 to 39, also are effective.

In addition, as a pigment applying compound besides the above-described couplers and the formula [LI], color silver compounds formed in that organic silver salt and pigments are combined with each other (see Research Disclosure, May 1978, pages 54 to 58), azo pigments used for a heat-developed silver dye bleaching process (see U.S. Pat. No. 4,235,957 and Research Disclosure, April 1976, pages 30 to 32), leuco pigments (see, for example, U.S. Pat. Nos. 3,985,565 and 4,022,617), or the like, also may be used.

Hydrophobic additives such as pigment applying compounds and nondiffusive reducing agents can be introduced into the layer of the photosensitive material by a well-known method described in U.S. Pat. No. 2,322,027 or the like. In this case, a high-boiling point organic solvent as described, for example, in U.S. Pat. Nos. 4,555,470, 4,536,466, 4,536,467, 4,587,106, 4,555,476 and 4,599,296, and Japanese Patent Publication No. 3-62256, can be used together with a low-boiling point organic solvent having a low boiling point of 50° C. to 160° C. when necessary. Further, two or more of the pigment applying compounds, nondiffusive reducing agents and high-boiling point organic solvent can be used at the same time.

The amount of high-boiling point organic solvent is less than or equal to 10 g per 1 g of pigment applying compounds to be used, preferably less than or equal to 5 g, and more preferably 1 g to 0.1 g. Further, the amount of high-boiling point organic solvent is less than equal to 1 cc per 1 g of binder, preferably less than or equal to 0.5 cc, and more preferably less than or equal to 0.3 cc.

A dispersing method using polymers also may be used, which is described in Japanese Patent Publication Nos. 51-39853 and 51-59943.

Compounds which are substantially insoluble in water can be dispersed and contained in a binder in a fine-grain state in addition to the above-described method.

When hydrophobic compounds are dispersed into a hydrophilic colloid, various types of surface-active agents can be used. Those shown as surface-active agents in Japanese Patent Application Laid-Open No. 59-157636, pages 37 and 38, and the Research Disclosure described above, can be used.

In the heat-developing photosensitive material of the present embodiment, compounds which attempt to activate development of the photosensitive material and stabilize an image can be used. The preferably used compounds are concretely described in U.S. Pat. No. 4,500,626, columns 51 and 52.

In a system which forms an image by a pigment diffusion transfer process, pigments or colored matters, which are not required for component layers of the heat-developing photosensitive material of the present embodiment, can be immobilized or decolorized, and various types of compounds can be added for the purpose of improving a white background of an image to be obtained.

Concretely, compounds described in European Patent Nos. 353,741 and 461,416, and Japanese Patent Application Laid-Open Nos. 63-163345 and 63-203158 can be used.

For the component layers of the heat-developing photosensitive material of the present embodiment, various types of pigments and dyes can be used for the purposes of improvement in color separation and high sensitization.

Concretely, as the compounds described in the above-described Research Disclosure, compounds described in European Patent Nos. 479,167 and 502,508, and Japanese Patent Application Laid-Open Nos. 1-167838, 1-343355, 2-168252 and 61-20943 can be used.

In a system which forms an image by a pigment diffusion transfer process, pigment fixing elements are used together with the heat-developing photosensitive material. The pigment fixing elements may be formed in a state of being coated on a base body different from that of the heat-developing photosensitive material or in a state of being coated on the same base body as that of the heat-developing photosensitive material. Each relative relationship of the photosensitive material with respect to the pigment fixing elements, the base body and the white reflecting layer, described in U.S. Pat. No. 4,500,626, column 57, is also applicable to the present invention.

The pigment fixing element preferably used for the heat-developing photosensitive material of the present embodiment has at least one layer having mordant and a binder. As the mordant, well-known agents in a photographic field can be used. Concrete examples of mordant include respective mordants described in U.S. Pat. No. 4,500,626, columns 58 and 59, and Japanese Patent Application Laid-Open Nos. 61-88256, pages 32 to 41, 1-161236, pages 4 to 7, and those described in Japanese Patent Application Laid-Open Nos. 62-244043 and 62-244036. Further, pigment-accepting high-molecular compounds as described in U.S. Pat. No. 4,463,079 also may be used.

The binder used for the pigment fixing element of the heat-developing photosensitive material of the present embodiment is preferably the hydrophilic binder as described above. Further, carageenans as described in European Patent No. 443,529 is preferably used together with the binder.

The pigment fixing element can have an auxiliary layer such as a protective layer, a releasing layer and a curling-prevention layer, when necessary. It is particularly effective to provide the protective layer.

For each component layer of the photosensitive material and pigment fixing element, high-boiling point organic solvent serving as a plasticizer, a slipping agent or an agent for improving separation of the photosensitive material and the pigment fixing element can be used. Concretely, examples are those described in the above-described Research Disclosure and Japanese Patent Application Laid-Open No. 62-245253.

Further, for the above-described purpose, various types of silicone oil (all types of silicone oil from dimethyl silicone oil to denatured silicone oil formed in that various types of organic groups are introduced into dimethyl siloxane) can be used. Examples of silicone oil include various types of denaturated silicone oil. Particularly, carboxy denaturated silicone oil (Product Name: X-22-3710), which is described in "Denaturated Silicone Oil" (published by Shin-etsu Silicone, technical materials pages 6–18B), is effective.

Further, silicone oil described in Japanese Patent Application Laid-Open Nos. 62-215953 and 63-46449 also is effective.

A fading inhibitor may be used for the photosensitive material or pigment fixing element. As the fading inhibitor, for example, an oxidation inhibitor, a ultraviolet absorbent, or a certain type of metal complex is included.

As the oxidation inhibitor, for example, chroman compounds, coumarane compounds, phenol compounds (for example, hindered phenols), hydroquinone derivatives, hindered amine derivatives, spiroindane compounds are included. Further, compounds described in Japanese Patent Application Laid-Open No. 61-159644 also are effective.

As the ultraviolet absorbent, benzotriazol compounds (see U.S. Pat. No. 3,533,794 or the like), 4-thiazolidone compounds (see U.S. Pat. No. 3,352,681), benzophenon compounds (see Japanese Patent Application Laid-Open No. 46-2784), and compounds described in Japanese Patent Application Laid-Open Nos. 54-48535, 62-136641 and 61-88256, are included. Further, the ultraviolet-absorptive polymer described in Japanese Patent Application Laid-Open No. 62-260152 also is effective.

As the metal complex, compounds described, for example, in U.S. Pat. Nos. 4,241,155, 4,245,018 (pages 3 to 36), 4,254,195 (columns 3 to 8), and Japanese Patent Application Laid-Open Nos. 62-174741, 61-88256 (pages 27 to 29), 63- 199248, 1-75568 and 1-74272 are included.

The fading inhibitor for preventing fading of the pigment transferred to the pigment fixing element may be previously contained in the pigment fixing element, or may be supplied from outside of the photosensitive material to the pigment fixing element.

The above-described oxidation inhibitor, ultraviolet absorbent and metal complex may be used in combinations.

A fluorescent brightening agent may be used for the photosensitive material and the pigment fixing element. Particularly, it is preferable that the fluorescent brightening agent is contained in the pigment fixing element or supplied from outside of the photosensitive material. Example of fluorescent brightening agent include compounds described, for example, in "The Chemistry of Synthetic Dyes" (edited by K. Veenkataraman, Vol. 5, Chapter 8) and Japanese Patent Application Laid-Open No. 61-143752. More concretely, stilbene compounds, coumarane compounds, biphenyl compounds, benzoxazolyl compounds, naphthalimide compounds, pyrazolyn compounds, carbostyril compounds, and the like are included.

The fluorescent brightening agent can be used in combination with a fading inhibitor or ultraviolet absorbent.

Each concrete example of the fading inhibitor, ultraviolet absorbent and fluorescent brightening agent is described in Japanese Patent Application Laid-Open Nos. 62- 215272, pages 125 to 137, and 1-161236, pages 17 to 43.

As a hardener used for each component layer of the photosensitive material and the pigment fixing element, respective hardeners described, for example, in the above-described Research Disclosure, U.S. Pat. Nos. 4,678,739, column 41, and 4,791,042, and Japanese Patent Application Laid-Open Nos. 59-116655, 62-245261, 61-18942 and 4-218044 are included. More concretely, aldehyde hardeners (such as formaldehyde), aziridine hardeners, epoxy hardeners, vinyl sulfone hardeners (such as N,N'-ethylenevis(vinylsulfonylacetamide)ethan), N-methylol hardeners (such as dimethylol urea), or polymer hardener (see compounds described in Japanese Patent Application Laid-Open No. 62-234157 or the like) are included.

These hardeners are each used by 0.001 to 1 g per 1 g of coated gelatin, preferably 0.005 to 0.5 g. Further, a layer to which the hardener is added may be any of each component layer of the photosensitive material and pigment fixing element, or the hardener may be added to two or more divided layers.

For each of the component layers of the photosensitive material and the pigment fixing element, various types of antifogging agents or photographic stabilizers, and precursors thereof, can be used. Concrete examples thereof include compounds described in the above-described Research Disclosure, U.S. Pat. Nos. 5,089,378, 4,500,627, and 4,614,702, Japanese Patent Application Laid-Open No. 64- 13546 (pages 7 to 9, 57 to 71 and 81 to 97), U.S. Pat. Nos. 4,775,610, 4,626,500 and 4,983,494, Japanese Patent Application Laid-Open Nos. 62-174747, 62-239148, 1-150135, 2-110557, 2-178650, RD No. 17643 (1978, pages 24 and 25), and the like.

The amount of these compounds used is preferably $5 \times 10^{-6}$ to $1 \times 10^{-1}$ mols per 1 mol of silver, more preferably, $1 \times 10^{-5}$ to $1 \times 10^{-2}$ mols.

For each component layer of the photosensitive material and the pigment fixing element, various types of surface-active agents can be used so as to serve as coating auxiliaries and for the various purposes of improving separation of the photosensitive material and the pigment fixing element, improving slipping property, preventing charging, facilitate development, and the like. A concrete example of surface-active agent is described, for example, in the above-described Research Disclosure, Japanese Patent Application Laid-Open Nos. 62-173463 and 62-183457.

Organic fluoro compounds may be contained in the respective component layers of the photosensitive material and the pigment fixing element for the purposes of improving slipping property, preventing charging, improving separation, and the like. A typical example of organic fluoro compounds is fluorine surface-active agents described, for example, in Japanese Patent Publication No. 57-9053 (columns 8 to 17), Japanese Patent Application Laid-Open Nos. 61-20944 and 62-135826, oil-like fluorine compounds such as fluoro-oil, or hydrophobic fluorine compounds such as solid-like fluorine compound resin (e.g., four-fluorine ethylene resin).

A mat material also can be used for the photosensitive material and the pigment fixing element. As the mat material, in addition to compounds such as siliconedioxide, polyolefin, and polymethacrylate, described in Japanese Patent Application Laid-Open No. 61-88256 (page 29), compounds such as benzoguanamin resin beads, polycarbonate resin beads, and AS resin beads, described in Japanese Patent Application Laid-Open Nos. 63-274944 and 63-274952, are included. In addition, compounds described in the above-described Research Disclosure also can be used.

Moreover, heat solvent, antifoaming agent, antibacterial/ dustproof agents, colloidal silica, or the like may be contained in the component layers of the photosensitive material and the pigment fixing element. Concrete examples of these additives are described, for example, in Japanese Patent Application Laid-Open Nos. 61- 88256 (pages 26 to 32) and 3-11338, and Japanese Patent Publication No. 2-51496.

In the heat-developing photosensitive material of the present embodiment, an image-recording promoter can be used for the photosensitive material and/or the pigment fixing element. The image-recording promoter has functions of promoting oxidation-reduction reaction between a silver salt oxidizing agent and a reducing agent, accelerating reaction such as formation or decomposition of pigments from a pigment applying matter, or emission of diffusive pigments, and promoting transfer of the pigments from a photosensitive material layer to a pigment fixing layer. From the viewpoint of physico-chemical functions, the image-recording promoter is classed into, for example, a base or a base precursor, nucleophilic compounds, high-boiling point organic solvent (i.e., oil), heat solvent, a surface-active agent, or compounds having an interaction with silver or silver ion. It should be noted that these groups of materials each generally have a complex function and usually they each have some of the above-described promotion effects at the same time. Detailed descriptions thereof are described in U.S. Pat. No. 4,678,739 (columns 38 to 40).

As the base precursor, organic acid decarboxylated by heat, salt of base, compounds which emit amines by intramolecular nucleophilic substitution reaction, Rossen dislocation, or Beckmann dislocation, are included. A concrete example thereof is described, for example, in U.S. Pat. Nos. 4,514,493 and 4,657,848.

In a system which effects heat development and transfer of pigments in the presence of a small quantity of water at the same time, it is preferable, for improving a preservative quality of the photosensitive material, that the base and/or the base precursor be contained in the pigment fixing element.

In addition, a combination of refractory metallic compounds described in European Patent Application Laid-Open No. 210,660 and U.S. Pat. No. 4,740,445, and compounds which effect formation of complex and reaction on metallic ions to form the above-described refractory metallic compounds (referred to as complex-forming compounds), compounds which form base by electrolysis, described in Japanese Patent Application Laid-Open No. 61- 232451, or the like can be used as the base precursor. Particularly, the former method is more effective. It is effective if the refractory metallic compounds and complex-forming compounds are separately added to the photosensitive material and the pigment fixing element.

In the heat-developing photosensitive material of the present embodiment, various types of development stop agents can be used for the photosensitive material and/or the pigment fixing element in order to constantly obtain a fixed image irrespective of each variation of processing temperature and processing time during development.

The development stop agent described herein means compounds which smoothly neutralize a base or reaction a base to reduce base density within a membrane and stop development, or compounds which interact with silver or silver salt to restrain development. Concretely, an acid precursor which emits acid by being heated, electrophilic compounds which cause, by heating, a substitution reaction with the base which exists together, or nitrogen-containing hereto ring compounds, mercapto compounds and their precursor, and the like are included. More specifically, such compounds are described in Japanese Patent Application Laid-Open No. 62-253159, pages 31 and 32.

As a base material of the photosensitive material and the pigment fixing element in the heat-developing photosensitive material of the present embodiment, materials which can resist the processing temperature of the photosensitive material can be used. Generally, a photographic base material such as a paper and synthesis polymer (film), described in "Fundamentals of Photographic Engineering—silver salt photographics—" edited by Nippon Shashin Gakkai and published by Corona Publishing Co., Ltd. (1979) (pages 223 to 240), and the like are included. Concretely, polyethylene terephthalate, polyethylene naphthalate, polycarbonate, poly vinyl chloride, polystyrene, polypropylene, polyimide, celluloses (for example, triacetyl cellulose), or materials formed in that pigments such as oxidized titanium are contained in each of these film materials, film-shaped synthetic paper formed of polypropylene, mixed paper made of synthetic resin pulp such as polyethylene and natural pulp, Yankee paper, barayta paper, coated paper (particularly, cast-coated paper), metal, cloths, glasses, and the like, are used.

The above-described materials may be used singly, or may be used as the base material whose one side or both sides is(are) laminated by synthetic polymer such as polyethylene.

In addition, base materials described, for example, in Japanese Patent Application Laid-Open Nos. 62-253159 (pages 29 to 31), 1-161236 (pages 14 to 17), 63-316848, 2-22651 and 3-56955, and U.S. Pat. No. 5,001,033 also can be used.

A hydrophilic binder, semiconducting metallic oxide such as aluminazol and tin oxide, carbon black, and the other antistatic agent may be coated on respective surfaces of these base materials.

The photosensitive material and/or pigment fixing element of the present embodiment may be constructed such as to have a conductive heat generator as heating means for heating development and diffusion transfer of pigments. In this case, applicable to the heating element is those described, for example, in Japanese Patent Application Laid-Open No. 61-145544.

The heating temperature during a heat developing process is approximately 50° C. to 250° C. Particularly the heating temperature of approximately 60° C. to 180° C. is effective. The diffusion transfer process of pigments may be effected at the same time of the heat developing process, or after the heat developing process. In the latter, the heating temperature in the transfer process is set in such a manner that the transfer process can be effected in a temperature range from that in the heat developing process to a room temperature. Particularly, it is preferable that the temperature during the transfer process is set in the temperature range from that greater than or equal to 50° C. to the temperature lower than that in the heat developing process by approximately 10° C.

The transfer of pigments is also effected only by heat, or may be effected by using solvent in order to facilitate the transfer of pigments. Further, it is also useful to use a method which heats pigments in the presence of a small quantity of solvent (particularly, water) and which effects development and transfer at the same time or successively, described, for example, in U.S. Pat. Nos. 4,704,345 and 4,740,445 and Japanese Patent Application Laid-Open No. 61- 38056. In this method, it is preferable that the heating temperature be greater than or equal to 50° C. and be less than or equal to a boiling point of the solvent. For example, when the solvent is water, it is preferable that the temperature be from 50° C. to 100° C.

Examples of solvents used for promotion of development and/or diffusion transfer of pigments include water, a basic aqueous solution containing inorganic alkali metal salt and organic base (as these bases, those described in the paragraph described below which explains the image forming promoter are used), low-boiling point solvent, or a mixed solution of low-boiling point solvent and water or the above-described basic aqueous solution. Further, a surface-active agent, antifogging agent, complex-forming compounds with refractory metallic salt, mildewproof agent or anti-bacterial agent may be contained in the solvent.

Among these solvents used in the process of heat developing or diffusion transfer, water is preferably used. Any water may be used which is generally available. Concretely, distilled water, water from a water service, well water, mineral water, or the like can be used. Further, in a heat developing apparatus using the photosensitive material and image receiving element of the present invention, water may be used once and thrown away, or may be used repeatedly by circulation. In the latter, a water containing component dissoluted from the material is used. Further, each apparatus and water, described, for example, in Japanese Patent Application Laid-Open Nos. 63-144354, 63-144355, 62-38460 and 3-210555, also may be used.

These solvents can be applied to any of the photosensitive material and the pigment fixing element, or both of them. The quantity used of solvent may be less than or equal to the weight of the solvent corresponding to the maximum swelling volume of the entire coating film.

As the method of applying water, methods described, for example, in Japanese Patent application Laid-Open Nos. 62-253159 (page 5) and 63-85544, are preferably used. Further, it is possible to encapsulate the solvent in a microcapsule or to previously contain the solvent in the form of hydrate in one of the photosensitive material and pigment fixing element, or both of them. It suffices that the temperature of water applied is 30° C. to 60° C. as described in the above-described Japanese Patent Application Laid-Open No. 63-85544 or the like.

Further, in order to promote the transfer of pigments, it is also possible to employ the method of containing hydrophilic heat solvent which is solid at a normal temperature and soluble at a high temperature, in the photosensitive material and/or the pigment fixing element. A layer in which the solvent is contained may be any one of a light-sensitive silver halide layer, intermediate layer, protective layer and pigment fixing layer, and particularly the pigment fixing layer and/or its adjacent layer is(are) preferable.

Examples of hydrophilic heat solvent include ureas, pyridines, amides, sulfonamides, imides, alcohols, oximes, and other heterocyclics.

A heating method in the process of development and/or transfer includes, for example, some methods of contacting pigments with a heated block or plate, contacting the pigments with a hot plate, hot presser, heat roller, heat drum, halogen lamp heater, infrared and far-infrared lamp heater, or the like, and causing the pigments to pass through a high-temperature atmosphere.

As a method of superposing the photosensitive material and the pigment fixing element, methods described in Japanese Patent Application Laid-Open Nos. 62-253159 and 61-147244 (page 27), are applicable.

An image recording apparatus 10 formed, on the whole, in the shape of a box is illustrated in FIG. 1. A front door and side door which are both unillustrated are mounted to a machine stand 12. When each door is opened, the inside of the machine stand 12 can be brought into an exposed state.

Further, a holding plate 12A for holding an original 42 is provided on an upper surface of the machine stand 12 of the image recording apparatus 10. The holding plate 12A is supported by an unillustrated rail for allowing the holding plate 12A to move in both left and right directions in FIG. 1. A rectangular hole is formed in the holding plate 12A and a transparent glass plate 45 is mounted to the holding plate 12A. An opening/closing pressing cover 12B is attached to the transparent glass plate 45 in such a manner that one side of the cover 12B, which is located at an innermost side of the apparatus 10 when viewed from the plane of FIG. 1, serves as an axis. Further, an unillustrated operating panel is provided on an upper surface of the machine stand 12.

As illustrated in FIG. 1, disposed inside the machine stand 12 of the image recording apparatus 10 is a photosensitive material magazine 14, in which a photosensitive material 16 is accommodated in such a manner as to be wound in the form of a roll. The photosensitive material 16 is wound in such a manner that a photosensitive surface (i.e., an exposure surface) is directed toward a winding shaft of the photosensitive material 16.

In a vicinity of a photosensitive material outlet in the photosensitive material magazine 14 in which the above-described heat-developing photosensitive material 16 is accommodated, nip rollers 18 and a cutter 20 are disposed, so that the photosensitive material 16 can be cut after a predetermined length thereof has been pulled out from the photosensitive material magazine 14.

A plurality of conveying rollers 19, 21, 23, 24, 26, and a guide plate 27 are disposed at a downstream side of a conveying path of the cutter 20, so that the photosensitive material 16 cut to the predetermined length can be conveyed to an exposure section 22.

The exposure section 22 is disposed between the conveying rollers 23 and the conveying rollers 24. An exposure portion (exposure point) is formed between these conveying rollers, through which the photosensitive material 16 passes. At the same time when the photosensitive material 16 passes therethrough, the above-described holding plate 12A moves in the same direction as that of the photosensitive material 16.

In a space between the exposure section 22 and the transparent glass plate 45, an exposure device 38 is provided. The exposure device 38 is provided with a light source 38A and a rod lens array 38B, which have a function of forming a reflection image of the original 42 disposed on the holding plate 12A moving simultaneously with the transport of the photosensitive material 16, on the photosensitive surface of the photosensitive material 16.

Figure 2:
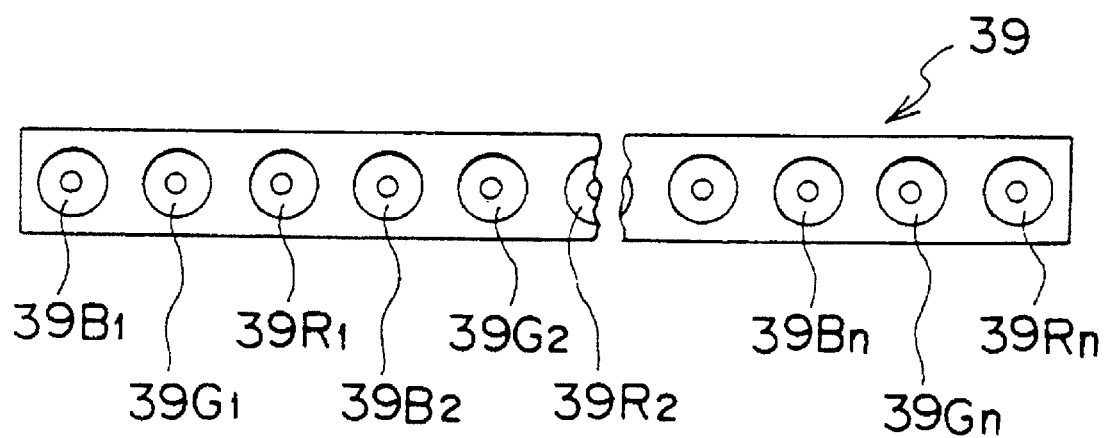
FIG. 2 is a front view illustrating a structure of an LED array according to the first embodiment.

The light source 38A is formed by two light emitting diode (LED) arrays 39 each having a plurality of blue-light LEDs 39B, green-light LEDs 39G and red-light LEDs 39R (see FIG. 2). These LEDs are arranged along a widthwise direction of the original 42.

Namely, as illustrated in FIG. 2, each of the LED arrays 39 is constructed such that LEDs (i.e., 39B1, 39G1, 39R1, 39B2, 39G2, 39R2 . . . , 39Bn, 39Gn, 39Rn) are arranged in a straight line along each widthwise direction of the original 42 and the photosensitive material 16 in the order of blue, green and red (which will be hereinafter referred to as B, G and R).

For this reason, light in which three colors of blue B, green G and red R are mixed together substantially uniformly, is evenly illuminated along the widthwise direction of the original 42 so that the image plane of the original 42 can be scanned by moving the holding plate 12A.

Further, each luminance and light emission time of these LEDs can be controlled independently. By controlling current, it is possible to strengthen or weaken a specific color when necessary and to vary the light emission time.

The rod lens array 38B is formed in such a manner as to incorporate lenses which respectively correspond to the plurality of LEDs provided in the LED arrays 39, so that the image of the original 42 can be formed on the photosensitive surface of the photosensitive material 16.

Namely, light reflected from the original 42 by each light from the LEDs is adapted to form an image on the photosensitive surface of the photosensitive material 16 via each lens of the rod lens array 38B.

Here, when the holding plate 12A and the photosensitive material 16 are moved in the same direction at the same speed, the image of the original 42 can be scanned and exposed (see the imaginary line in FIG. 1). Meanwhile, after scanning and exposing, the holding plate 12A returns to its original position (indicated by the solid line in FIG. 1).

A switchback portion 40 is provided on a side of the exposure section 22 and a water applying section 62 is provided beneath the exposure section 22. The photosensitive material 16 moves upward on a side of the photosensitive material magazine 14, along the conveying path and is exposed in the exposure section 22, and thereafter is temporarily conveyed to the switchback portion 40. Thereafter, the photosensitive material 16 is adapted to be conveyed to the water applying section 62 via the conveying path disposed beneath the exposure section 22 by a reverse rotation of the conveying roller 26.

A plurality of pipes is connected to the water applying section 62 so as to supply water.

A heat development transfer section 104 is disposed on a side of the water applying section 62 and the water-applied photosensitive material 16 is conveyed to the heat development transfer section 104.

On the other hand, an image receiving material magazine 106 is disposed on the side of the photosensitive material magazine 14 within the machine stand 12. An image receiving material 108 is accommodated in the image receiving material magazine 106 wound in the form of a roll. A pigment fixing material containing mordant is applied to an image forming surface of the image receiving material 108 and the image receiving material 108 is wound so that the image forming surface is directed toward a direction of a shaft which winds the image receiving material 108.

The image receiving material magazine 106 is, in the same way as the photosensitive material magazine 104, formed by a trunk portion and a pair of side frame portions respectively fixed to both end portions of the trunk portion, and can be pulled out toward a front side of the machine stand 12 (i.e., the side which can be viewed in FIG. 1, namely, a transverse direction of the wound image receiving material 108).

In a vicinity of an image receiving material outlet of the image receiving material magazine 106, nip rollers 110 are disposed so as to pull the image receiving material 108 out from the image receiving material magazine 106 and to release the state of nipping the image receiving material 108. A cutter 112 is disposed on the side of the nip rollers 110.

On the side of the cutter 112, an image receiving material conveying section 180 is provided on the side of the photosensitive material magazine 14. Conveying rollers 186, 190,114, and a guide plate 182 are disposed in the image receiving material conveying section 180, so that the image receiving material 108 cut to a predetermined length can be conveyed to the heat development transfer section 104.

The photosensitive material 16 to be conveyed to the heat development transfer section 104 is delivered between a laminating roller 120 and a heating drum 116. Further, the conveying of the image receiving material 108 is synchronized with the conveyance of the photosensitive material 16, such that, in the state in which the photosensitive material 16 precedes the image receiving material 108 by a predetermined length, the image receiving material 108 is delivered between the laminating roller 120 and the heating drum 116 so as to be superposed onto the photosensitive material 16.

A pair of halogen lamps 132A, 132B is disposed within the heating drum 116 so that the temperature of the surface of the heating drum 116 can be increased.

An endless pressure-contact belt 118 is trained around five winding rollers 134, 135, 136, 138 and 140. An outer side of the endless pressure-contact belt 118 disposed between the training roller 134 and the training roller 140 is pressed into contact with an outer periphery of the heating drum 116.

A bending/guiding roller 142 is disposed downstream of the endless pressure-contact belt 118 in the conveying direction of the materials and beneath the heating drum 116. A peeling claw 154 is disposed downstream of the bending/guiding roller 142 in the conveying direction of the materials and beneath the heating drum 116, and is axially supported so as to be pivotable.

The photosensitive material 16 peeled by the peeling claw 154 is trained around the bending/guiding roller 142, and is accumulated in a waste photosensitive material accommodating box 178.

A peeling roller 174 and a peeling claw 176 are disposed in a vicinity of the heating drum 116 on the side of the bending/guiding roller 142. An image receiving material guide 170 and image receiving material discharge rollers 172, 173, 175 are disposed beneath the peeling roller 174 and the peeling claw 176. The image receiving material 108 peeled from the heating drum 116 by the peeling roller 174 and the peeling claw 176 can be guided and conveyed.

The image receiving material 108 peeled from the outer periphery of the heating drum 116 by the peeling claw 176 is conveyed by the image receiving material guide 170 and the image receiving material discharge rollers 172, 173, 175 and is discharged into a tray 177.

Next, an operation of the first embodiment will be described.

After the pressing cover 12B is closed, the magnification, the number of sheets to be processed, and the like are designated by operating the operating panel (not shown). When a start instruction is issued, image processing is started.

Namely, the nip roller 18 is actuated in a state in which the photosensitive material magazine 14 has been set in the apparatus 10, and the photosensitive material 16 is pulled out by the nip roller 18. When the photosensitive material 16 is pulled out by a predetermined length, the photosensitive material 16 is cut to a predetermined length by the cutter 20.

After the operation of the cutter 20, the photosensitive material 16 is reversed by being conveyed along the conveying path and is conveyed to the exposure section 22 in a state in which the photosensitive surface (i.e., the exposure surface) of the photosensitive material 16 faces upward. The holding plate 12A starts moving simultaneously with the conveying of the photosensitive material 16. The velocity of the holding plate 12A with respect to the conveying speed of the photosensitive material 16 is determined on the basis of the magnification designated by the operating panel.

When a leading end portion of the photosensitive material 16 reaches a predetermined position, the holding plate 12A starts moving at this point of time and each LED of the LED arrays 39 is turned on.

The light emission time of each LED is controlled independently, and the luminance thereof is also controlled independently. This makes it possible to easily control the quantity of light of each color in accordance with the density of the used original 42 and the color balance of the photosensitive material 16.

When the holding plate 12A is moved, the image plane of the original 42 is scanned linearly and the reflected light is used by the rod lens array 38B to form an image on the photosensitive surface of the photosensitive material 16.

As a result, since the optimum quantity of light and the best quality of light can be obtained only by controlling current for each LED even if a color filter or diaphragm mechanism is not provided on an optical axis, the construction of the exposure device 38 can be simplified.

The photosensitive material 16 positioned in the exposure section 22 is scanned and exposed by the exposure device 38.

The photosensitive material 16 in which an image is formed is conveyed to an unillustrated development section, where a reproduction image can be obtained by the development processing of the photosensitive material 16.

According to the first embodiment, the luminance and light emission time of each LED serving as a light source can be controlled independently. After exposure processing starts, the exposed photosensitive material 16 is temporarily delivered to the switchback portion 40, and thereafter, is conveyed to the water applying section 62 by a reverse rotation of the conveying roller 26.

In the water applying section 62, water is applied to the photosensitive material 16. Further, the photosensitive material 16 passes through the water applying section 62 while excess water is removed from the photosensitive material 16 by squeeze rollers 68.

The photosensitive material 16 to which water, serving as an image forming solvent, is applied in the water applying section 62 is delivered to the heat development transfer section 104 by the squeeze rollers 68.

On the other hand, together with the start of scanning and exposing the photosensitive material 16, the image receiving material 108 is also pulled out from the image receiving material magazine 106 by the nip rollers 110 and is conveyed. When the image receiving material 108 is pulled out by a predetermined length, the image receiving material 108 is cut to the predetermined length by the cutter 112.

After operation of the cutter 12, the image receiving material 108 is conveyed by conveying rollers 190, 186 and 114 while being guided by a guide plate 182 and is brought into a waiting state directly before the heat development transfer section 104.

In the heat development transfer section 104, when it is detected that the photosensitive material 16 has been delivered between the outer periphery of the heating drum 116 and the laminating roller 120 by the squeeze rollers 68, the conveying of the image receiving material 108 starts again, so that the image receiving material 108 is delivered to the laminating roller 120 and the heating drum 116 is activated.

In this case, a guide plate 122 is disposed between the laminating roller 120 and the squeeze rollers 68 of the water applying section 62, and the photosensitive material 16 conveyed from the squeeze rollers 68 is guided to the laminating roller 120 without fail.

The photosensitive material 16 and the image receiving material 108, which are superposed onto each other by the laminating roller 120, are nipped between the heating drum 116 and the endless pressure-contact belt 118 in the superposed state and conveyed for approximately ⅔ of the periphery of the heating drum 116 (i.e., between the training roller 134 and the training roller 140). As a result, the photosensitive material 16 and the image receiving material 108 are both heated and mobile pigments are emitted. At the same time, these pigments are transferred to a pigment fixing layer of the image receiving material 108 so that an image is obtained.

Thereafter, when the photosensitive material 16 and the image receiving material 108 are nipped and conveyed and then reach a lower portion of the heating drum 116, the peeling claw 154 is moved by a cam (not shown). The peeling claw 154 engages a leading end portion of the photosensitive material 16 which is being conveyed so as to precede the image receiving material 108 by a predetermined length. As a result, the leading end portion of the photosensitive material 16 is peeled from the outer periphery of the heating drum 116. In addition, the return movement of the peeling claw 154 causes a pinch roller (not shown) to press the photosensitive material 16. Accordingly, the photosensitive material 16 is trained around the bending/guiding roller 142 while being pressed by the pinch roller, and is moved downward to be accumulated in the waste photosensitive material-accommodating box 178.

On the other hand, the image receiving material 108, which separates from the photosensitive material 16 and moves in a state of closely contacting the heating drum 116, is conveyed to the peeling roller 174 and is peeled from the heating drum 116.

The image receiving material 108 peeled from the outer periphery of the heating drum 116 by the peeling claw 176 is moved downward while being trained around the peeling roller 174 and is conveyed by image receiving material discharge rollers 172, 173 and 175 while being guided by an image receiving material guide 170 and is further discharged to the tray 177.

Since, LEDs are used as the light source 38A of the image recording apparatus as described in the first embodiment, the number of component parts of the exposure device 38 is reduced and the optical path of an optical system does not need to be lengthened. This makes it possible to dramatically reduce the size of the apparatus. Further, since the optical path is short, dust has little influence and the quality of an image improves.

Figure 3:
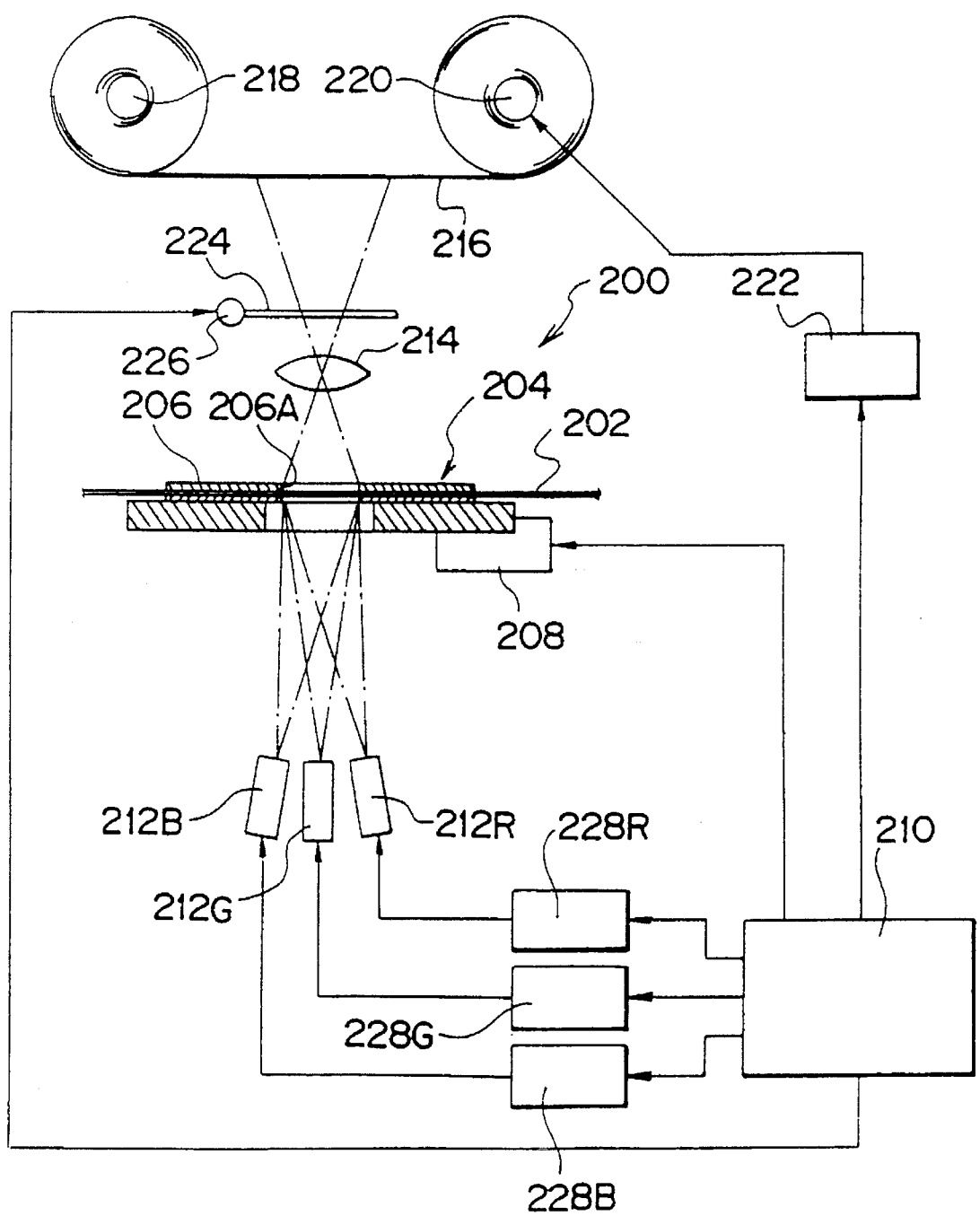
FIG. 3 is a schematic view of a photographic printing apparatus (for surface exposing) according to a second embodiment of the present invention.

FIG. 3 illustrates a photographic printing apparatus 200 which serves as an image recording apparatus according to a second embodiment of the present invention. A color printing paper is used as the photosensitive material.

A negative film 202 serving as a transparency original is held by a negative carrier 204. Provided in the negative carrier 204 is a mask 206 in which a rectangular hole 206A is formed. The mask 206 holds the negative film 202 from the obverse and reverse sides thereof. The negative carrier 204 is provided with a drive portion 208 which is used such that the negative film 202 can be sequentially corresponded to the hole 206A of the mask 206 for each image frame. The drive portion 208 is controlled by a controller 210.

Each light emitted from the color LEDs 212B, 212G and 212R (corresponding to blue, green and red, respectively), serving as light sources, is irradiated onto the negative film 202 held by the mask 206 of the negative carrier 204. The transmitted light is used by a lens 214 to form an image on a photosensitive surface of a printing paper 216. As a result, an image on the negative film 202 is printed and exposed on the printing paper 216.

Both ends of the printing paper 216 are respectively wound around reels 218, 220. A motor 222 is connected to the reel 220 so as to rotate the reel 220. The exposed printing paper is wound in synchronism with the movement of image frames of the negative film 202 by a signal from the controller 210.

Further, a shutter 224 is disposed between the lens 214 and the printing paper 216 in such a manner as to open or close an optical path by a shutter driving portion 226 connected to the controller 210.

The above-described LEDs 212B, 212G and 212R are respectively adapted to emit light by signals from current control sections 228B, 228G and 228R each connected to the controller 210, so that each color can be controlled independently.

Namely, in the present embodiment, each light emission time and luminance of the LEDs 212B, 212G and 212R is controlled in accordance with the exposure amount (or exposure correction amount) in correspondence with the used negative film 202 and printing paper 216, or the color balance. For this reason, it is not necessary to specially provide a color filter, diaphragm mechanism or the like.

Next, an operation of the second embodiment will be described.

The negative film 202 is conveyed by the negative carrier 204 such that an image frame to be printed can correspond to the hole 206A of the mask 206. At this time, the exposure amount (or exposure correction amount) corresponding to the image frame of the negative film 202 is inputted to (or calculated in) the controller 210, and simultaneously, the color balance in accordance with the kind of printing paper 216 to be used is inputted to (or calculated in) the controller 210. Subsequently, the controller 210 outputs a signal for opening the shutter 224, to the shutter driving portion 226, and simultaneously, outputs signals to each of current control sections 228B, 2286 and 228R on the basis of the above-described inputted or calculated exposure amount (or exposure correction amount) and the color balance.

On the basis of the signals, the current control sections 228B, 2286 and 228R respectively cause the LEDs 212B, 2126 and 212R to emit light. The light emission time of each LED after light emission starts is controlled independently and the luminance thereof is also controlled independently.

For this reason, it becomes unnecessary to mount or remove a color filter and provide a mechanism such as a diaphragm, which was conventionally needed when a halogen lamp was used as a light source. Further, it suffices that only controlling current to the LEDs, 212B, 2126 and 212R is necessary. Accordingly, an apparatus configuration is simplified and the overall apparatus can be made smaller.

Meanwhile, in the second embodiment, one color each of the LEDs 212B, 2126 and 212R is used. However, a each LED may be provided.

Further, when a plural number of each color LED is disposed, LEDs of the same color having different peak wavelengths may be provided in accordance with spectral absorption of pigments of an original image and any one of the same color LEDs may be selected in accordance with the kind of original. For example, in a case of an original for a negative slide, it is preferable that the peak wavelength of R be 650 nm. In a case of an original for a positive slide, it is preferable that the peak wavelength of R be 700 nm. Accordingly, if only LEDs having two kinds of peak wavelengths are previously provided, the light emission time can be shortened and the processing speed as a whole can be improved.

Figure 4:
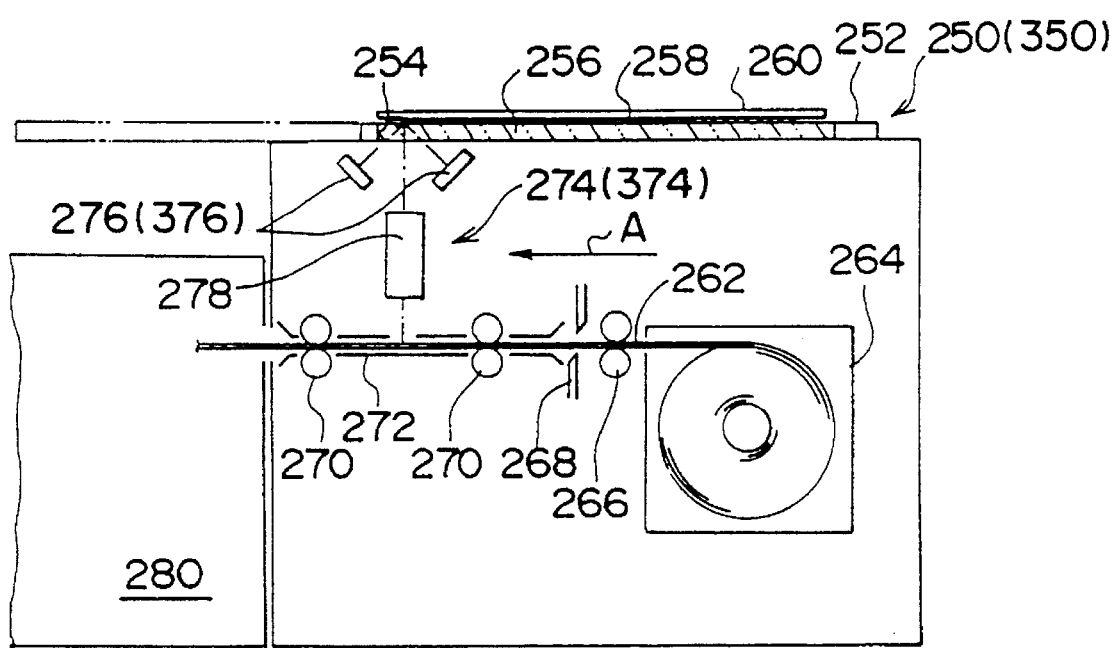
FIG. 4 is a schematic view of an image recording apparatus (for scanning and exposing) according to third and fifth embodiments of the present invention.

FIG. 4 shows an image recording apparatus 250 according to a third embodiment of the present invention. The image recording apparatus 250 is constructed mainly so as to record an original image of even magnification.

An upper surface of the image recording apparatus 250 is opened, and a moving plate 252 is mounted to the upper surface via a pair of rails which are parallel to each other (not shown). The moving plate 252 can move along the rails in both left and right directions in FIG. 4 and is moved by a driving force of an unillustrated drive means.

A rectangular hole 254 is formed in the moving plate 252 and a transparent glass plate 256 is mounted to the rectangular hole 254. An original 258 is put on the transparent glass plate 256 in such a manner that an image of the original 258 faces downward. Further, an opening/closing pressing cover 260 is disposed so as to correspond to the transparent glass plate 256. When the pressing cover 260 is closed in a state in which the original 258 is put on the transparent glass plate 256, the original 258 can be held.

The apparatus 250 includes a magazine 264, in which a color printing paper used as the photosensitive material 262 is wound in the form of a roll. A pair of rollers 266 and a cutter 268 are disposed in a vicinity of a photosensitive material outlet of the magazine 264. Thus, the photosensitive material 262 pulled out from the photosensitive material outlet is nipped by the pair of rollers 266 and cut by the cutter 268 to a predetermined length. Subsequently, the photosensitive material 262 is guided by a guide plate 272 by means of a driving force of a roller pair 270 and is conveyed in a direction in which the moving plate 252 moves (i.e., the direction of arrow A in FIG. 4).

An exposure device 274 is provided in a space between the transparent glass plate 256 and the conveying path of the photosensitive material 262.

Figure 5:
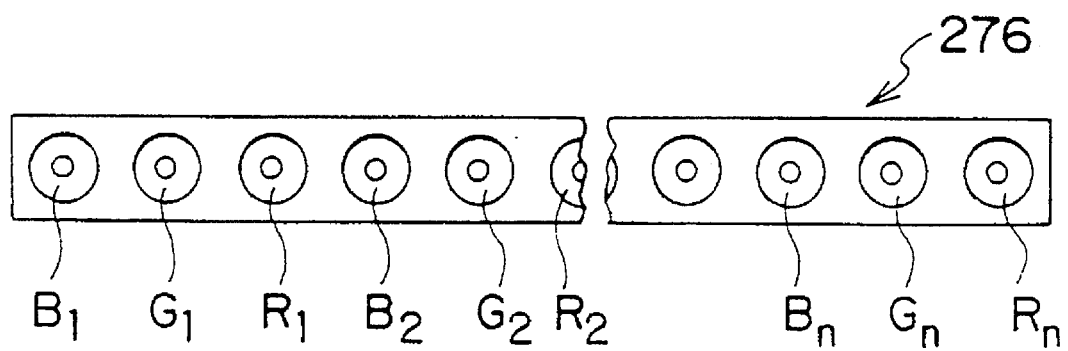
FIG. 5 is a front view illustrating a structure of an LED array according to the third embodiment.

The exposure device 274 is formed by a LEDs 276 emitting, as the light source, lights of each color of blue, green and red, and a rod lens array 278 serving as a lens unit. As illustrated in FIG. 5, the LEDs 276 are arranged in a straight line along the widthwise direction of the original 258 and the photosensitive material 262 in the order of blue, green and red (B1, G1, R1, B2, G2, R2 . . . , Bn, Gn, Rn).

For this reason, light in which respective colors of BGR are mixed substantially uniformly with each other is evenly irradiated onto the original 258 along the widthwise direction of the original 258 such that an image plane of the original 258 can be scanned by moving the moving plate 252.

Further, the luminance and light emission time of each LED 276 can be independently controlled. Thus, by controlling current, it is possible to, when necessary, strengthen or weaken a specific color and vary the light emission time of each LED.

The rod lens array 278 is formed by lenses which respectively correspond to the plurality of LEDs 276 being incorporated in the rod lens array 278, so that an image of the same magnification as the image of the original 258 can be formed on the photosensitive surface of the photosensitive material 262.

In other words, light reflected from the LED 276 whose light is illuminated to the original 258 is used by each lens of the rod lens array 278 so as to form an image on the photosensitive surface of the photosensitive material 262.

Here, when the moving plate 252 and the photosensitive material 262 are moved in the same direction at the same velocity, the image of the original 258 can be scanned and exposed (see the imaginary line in FIG. 4). Meanwhile, after scanning and exposing, the moving plate 252 is adapted to return to its original position.

The photosensitive material 262 on which an image is formed and recorded is delivered to a development section 280 adjacent to the exposure device 274, in which the developing of the photosensitive material 262 is effected.

Next, an operation of the third embodiment will be described.

Positioning of the original 258 is completed by holding the original 258 on the transparent glass plate 256 and closing the pressing cover 260.

When an instruction to start exposure is issued, the photosensitive material 262 nipped by the pair of rollers 266 is pulled out from the magazine 264 and cut by the cutter 268 to the predetermined length.

When the photosensitive material 262 reaches a predetermined position, the moving plate 252 starts moving at this point of time in the direction in which the photosensitive material 262 is guided and conveyed by the guide plate 272 at the same velocity of the photosensitive material 262, so that the LEDs 276 are turned on.

The light emission time of each LED 276 is independently controlled and the luminance thereof is also independently controlled. This makes it possible to easily control the quantity of light of each color in accordance with the density of the original 258 and the color balance of the photosensitive material 262.

When the moving plate 252 and the photosensitive material 262 are moved in the same direction at the same speed, an image plane of the original 258 is scanned linearly and the reflected light is used by the rod lens array 278 to form an image on the photosensitive surface of the photosensitive material 262.

The photosensitive material 262 onto which the image is formed is delivered to the development section 280, where the developing of the photosensitive material is effected so that a reproduction image can be obtained.

In the third embodiment, a plurality of LEDs 276, each having a luminance and light emission time that are independently controlled, are used as light sources and the rod lens array 278 is used as the lens unit. For this reason, it is no longer necessary to mount or remove a color filter, and provide a mechanism such as diaphragm, which was needed when a halogen lamp was used as the light source. Further, it suffices that only the current to the LEDs 276 be controlled. Accordingly, apparatus configuration is simplified and the apparatus can be made small.

Further, since the present apparatus is constructed mainly for the purpose of recording an image of an even magnification, when each of the LEDs 276, whose luminance and light emission time can easily and independently be controlled, are used, the rod lens array 278 can be used and the apparatus can be made even smaller.

Meanwhile, in the third embodiment, the photosensitive material 262 is accommodated in the form of a roll. However, sheet-type photosensitive material is also applicable.

Further, although each of the LEDs 276 is constructed so that respective colors are arranged in a straight line in the order of blue, green and red, three lens arrays for blue light, green light and red light may be provided.

Figure 6:
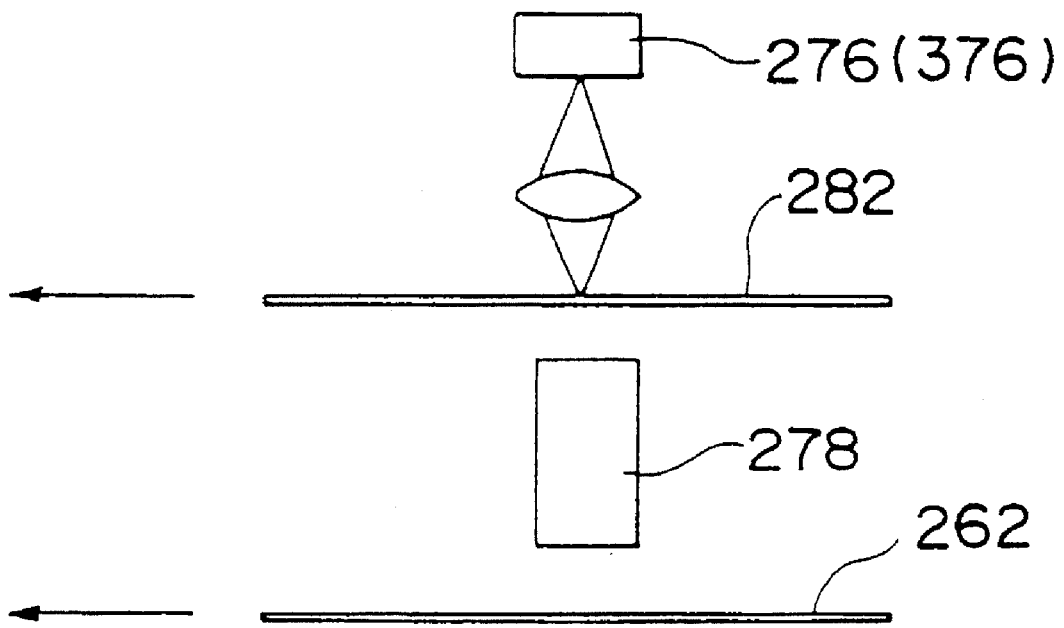
FIG. 6 is a schematic view of a main portion of a modified example of the third and fifth embodiments.

The third embodiment was described in the case of the reflection original 258. However, when a transparency original 282 is used as illustrated in FIG. 6, it suffices that the transparency original 282 passes between the LED 276 and the rod lens array 278.

Figure 7:
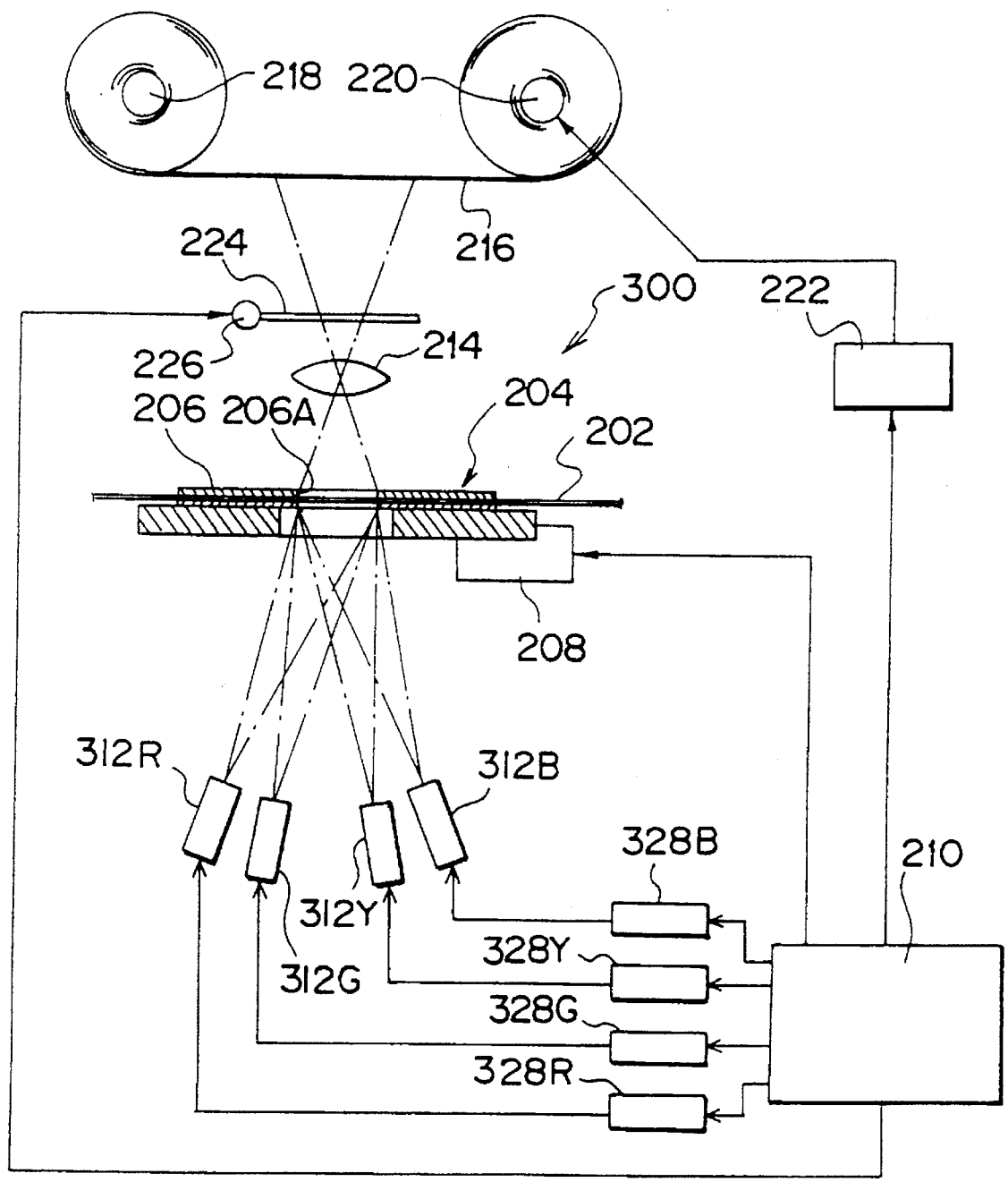
FIG. 7 is a schematic view of a photographic printing apparatus (for surface exposing) according to a fourth embodiment of the present invention.

FIG. 7 shows a photographic printing apparatus 300 serving as an image recording apparatus according to a fourth embodiment of the present invention. It should be noted that the same components as those of the second embodiment will be denoted by the same reference numerals, and a description thereof will be omitted.

Each light emitted from four LEDs each having one of four colors (red, green, yellow and blue) 812R, 312G, 312Y and 312B, which are used as light sources, is irradiated onto a negative film 202 held by a mask 206 of a negative carrier 204. The transmitted light is used by a lens 214 to form an image on a photosensitive surface of a printing paper 216. As a result, an image on the negative film 202 is printed and exposed on the printing paper 216.

Figure 9:
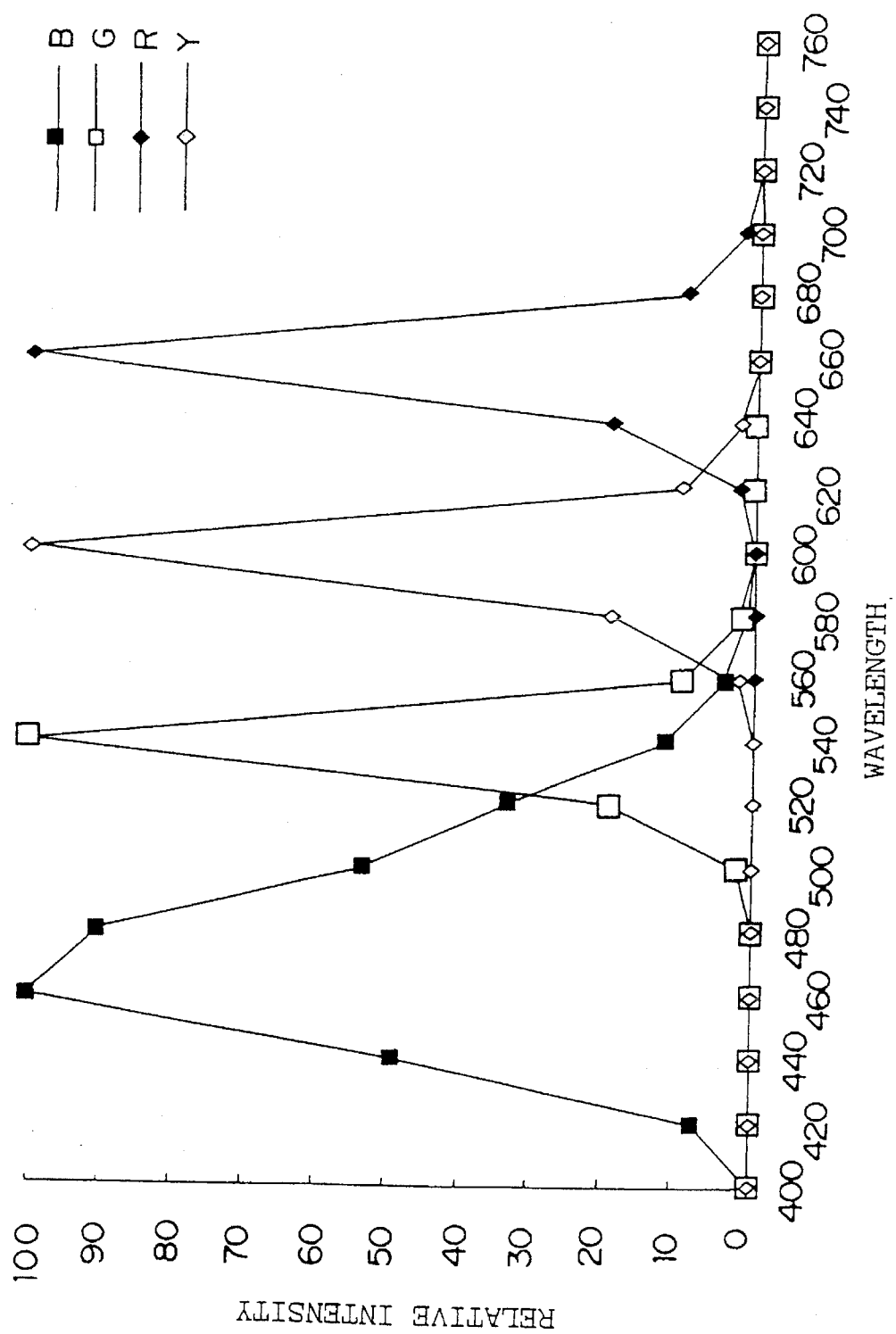
FIG. 9 is a diagram illustrating a relationship between a relative strength and a wavelength of the colors blue, green, yellow and red emitted by light emitting diodes (LEDs), assuming that light intensity of a central wavelength of each light of blue, green, yellow and red, is regarded as 100.
Figure 10:
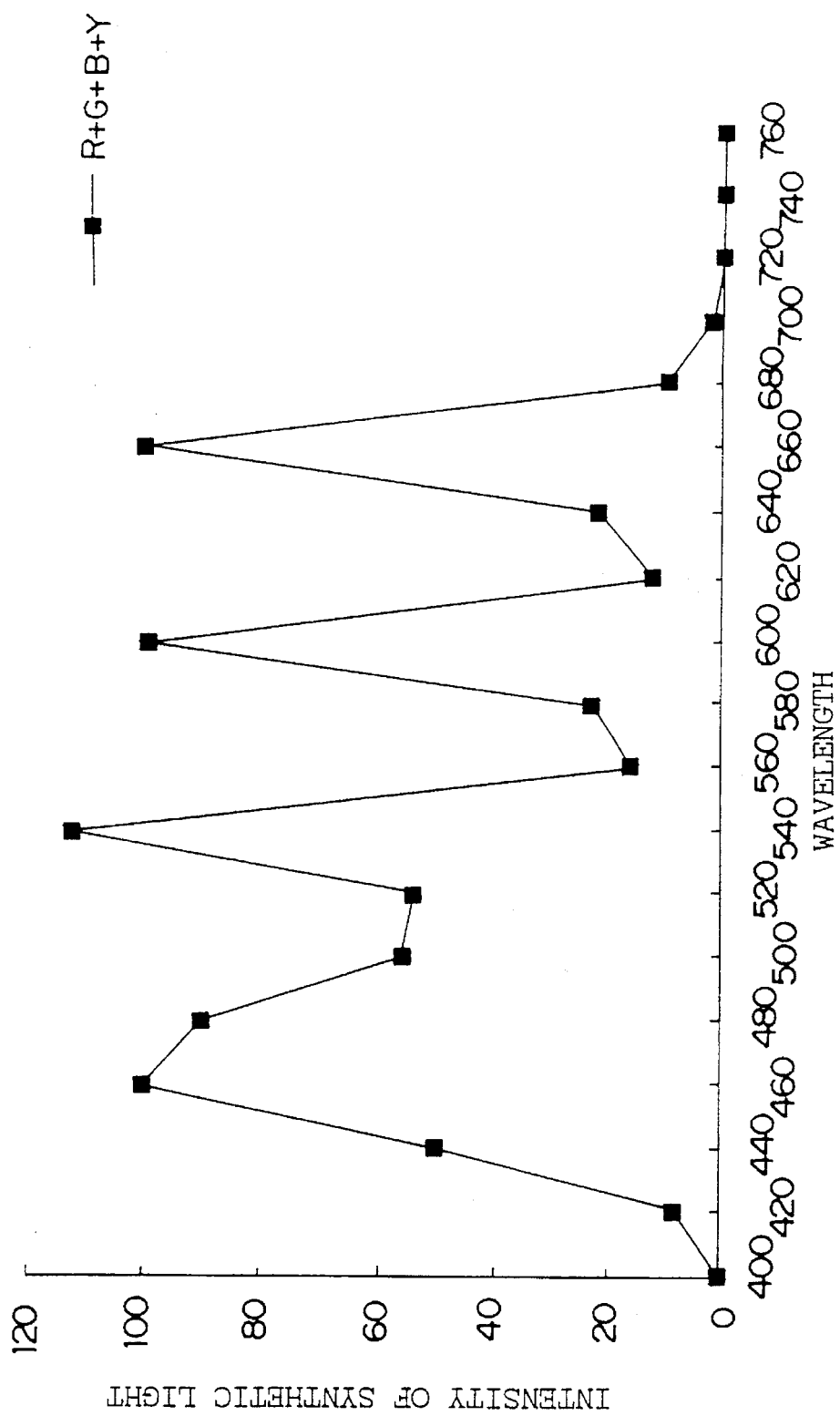
FIG. 10 is a diagram illustrating a relationship between an intensity of synthetic light of blue, green, yellow and red, emitted by light emitting diodes, and a wavelength thereof.

Here, as shown in FIG. 9, which represents the relative intensity of each respective color assuming that the light intensity of each color at a central wavelength is regarded as 100, the LED 812R emits red light, of which the waveband is set within a range from approximately 620 to 700 nm and the central wavelength is 660 nm or thereabouts. LED 312G emits green light, of which the waveband is set within a range from approximately 500 to 580 nm and the central wavelength is 540 nm or thereabouts. LED S12B emits blue light, of which the waveband is set within a range from approximately 420 to 580 nm and the center wavelength is 460 nm or thereabouts. LED 312Y emits yellow light, of which the waveband is set within a range from approximately 560 to 640 nm and the center wavelength is 600 nm or thereabouts. The intensity of synthetic lights, red, green, blue and yellow is illustrated in FIG. 10. In addition, the synthetic light of these colors is irradiated on the negative film 202.

The LEDs 312R, 312G, 312Y and 312B emit light in accordance with signals from current control sections 328R, 328G, 328Y and 328B which are respectively connected to the controller 210, so that the color of each LED can be independently controlled. Namely, in the fourth embodiment, the light emission time and light emission intensity of each of the LEDs 312R, 312G, 312Y and 312B can be separately adjusted in accordance with the density of the reflection or transparency original image, color balance, the kind of printing paper being used, or the like. In this case, the density of the reflection original image or transparency original image, and the color balance may be obtained visually. Further, the density of image frames of the negative film 202 and the color balance may be obtained by measurement using a CCD or calculation.

Next, an operation of the fourth embodiment will be described.

The negative film 202 is conveyed by the negative carrier 204 so that an image frame to be printed corresponds to the hole 206A of the mask 206. At this time, the controller 210 inputs an exposure amount (or an exposure correction amount) corresponding to the image frame of the negative film 202, from an unillustrated CCD camera which photometrically measures the negative film 202, and simultaneously, inputs the color balance in accordance with the kind of printing paper 216 to be used. Subsequently, the controller 210 outputs a signal for opening the shutter 224 in the shutter driving portion 226, and simultaneously, on the basis of the input or calculated exposure amount (exposure correction amount) and the color balance, outputs signals to the current control sections 328R, 328G, 328Y and 328B.

The current control sections 328R, 328G, 328Y and 328B respectively cause the LEDs 312R, 312G, 312Y and 312B to emit light. The light emission time of each LED, from the time when light starts emitting, is controlled independently. The light emitting intensity of each LED is also controlled independently. The light, of which light emission time and light emitting intensity were controlled, is transmitted to the negative film 202 via the lens system 214 to form an image on the photosensitive surface of the printing paper 216. As a result, an image recorded on the original is recorded on the printing paper 216.

As described above, since the light emission time and light emitting intensity of each of LEDs 312R, 312G, 312Y and 312B is separately adjusted in accordance with the density of the image frame of the negative film 202 and the exposure amount and the color balance depending on the type of printing paper 216, a suitable image which corresponds to the original can be recorded. It therefore becomes unnecessary to specially provide a color filter, diaphragm mechanism, or the like. As a result, the apparatus can be made small.

Figure 11:
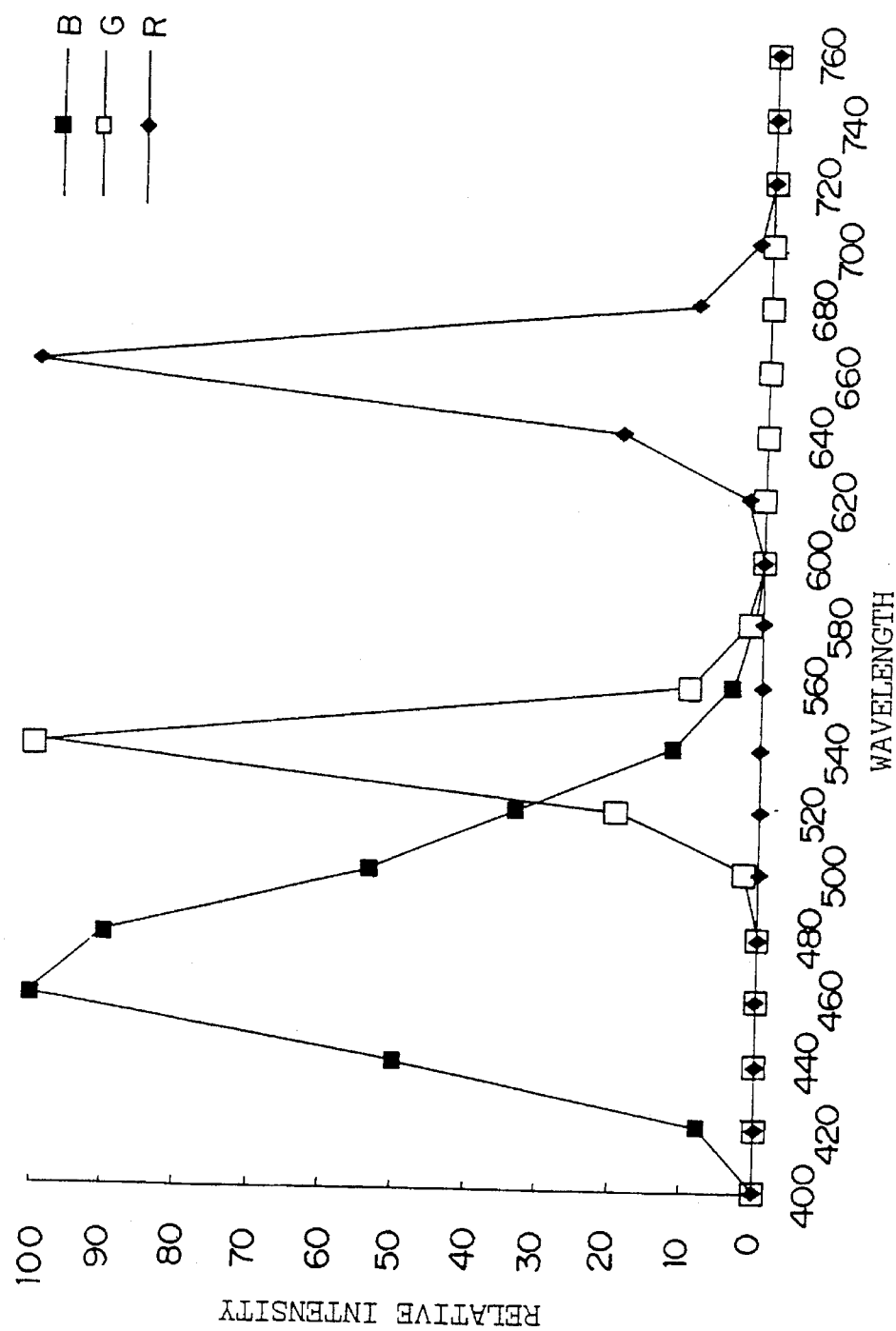
FIG. 11 is a diagram illustrating a relationship between a relative strength and a wavelength of each color of blue, green and red emitted by light emitting diodes, assuming that light intensity of a central wavelength of each light of blue, green and red, is regarded as 100.
Figure 12:
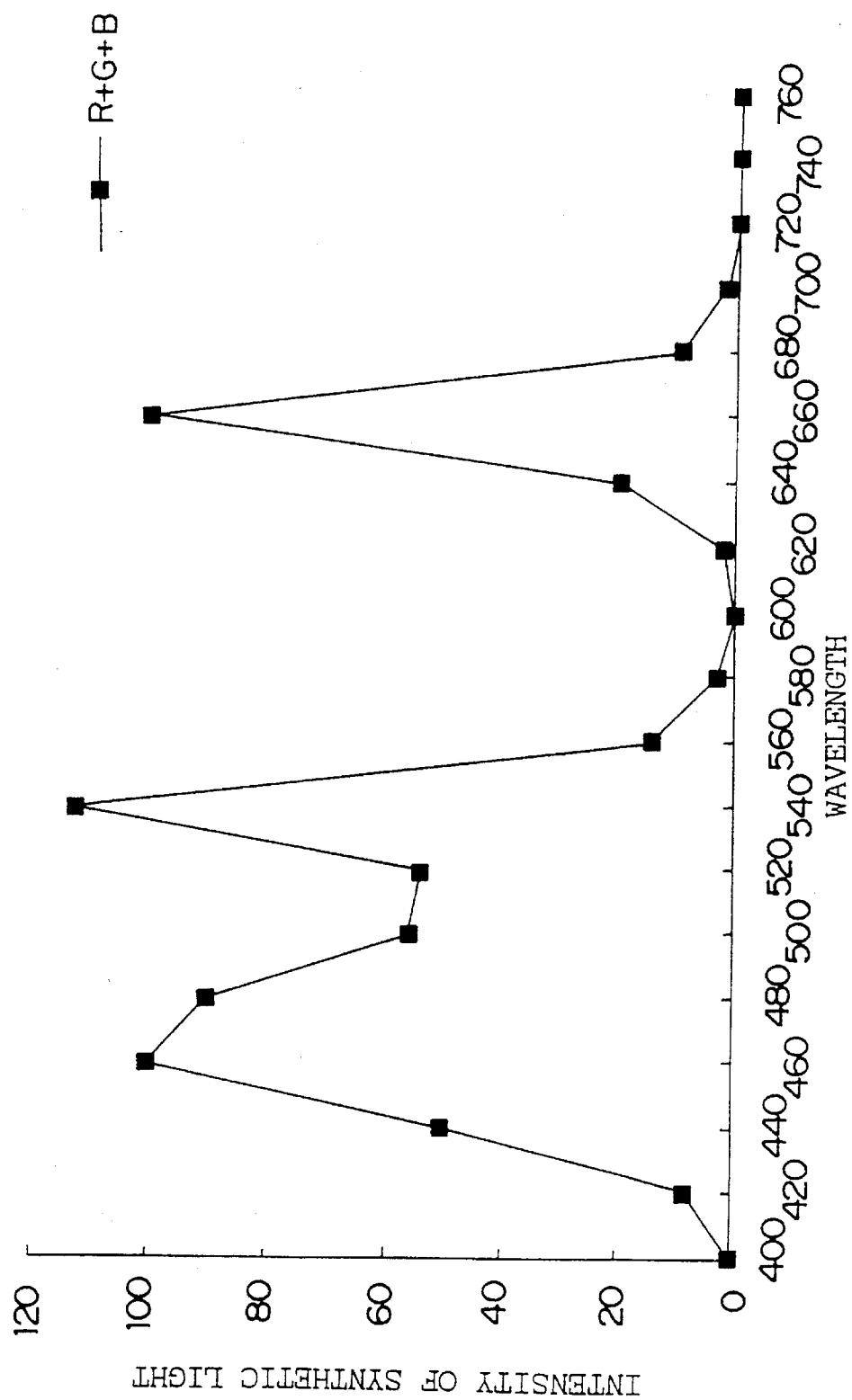
FIG. 12 is a diagram illustrating a relationship between an intensity of synthetic light of blue, green and red, emitted by light emitting diodes, and a wavelength thereof.

Further, as illustrated in FIGS. 11 and 12, when each light of three colors of red, green and blue is irradiated on the negative film, the intensity of the light within a range of wavelengths whose center is 600 nm is insufficient. Accordingly, in the fourth embodiment, as illustrated in FIG. 9, in addition to three colors of red, green and blue, yellow light, of which the waveband is set within a range from approximately 560 to 640 nm with 600 nm as the center, is irradiated onto the negative film. As a result, color reproducibility of the negative film for the printing paper can be further improved.

Meanwhile, in the fourth embodiment, one colored LED 312R, 312G, 312Y and 312B each is provided. However, a plural number of LEDs may be provided.

FIG. 4 illustrates an image recording apparatus 350 according to a fifth embodiment of the present invention. The image recording apparatus 350 is constructed mainly for the purpose of recording an original image of an even magnification. It should be noted that the same components as those of the third embodiment will be denoted by the same reference numerals, and a description thereof will be omitted.

An exposure device 374 is disposed in a space between the transparent glass plate 256 and the conveying path of the photosensitive material 262.

Figure 8:
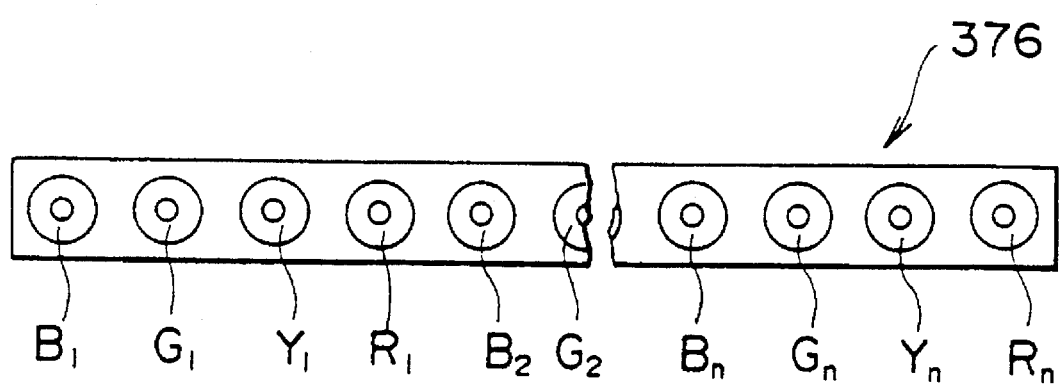
FIG. 8 is a front view illustrating a structure of an LED array according to the fifth embodiment.

The exposure device 374 is formed by a plurality of LEDs 376 each emitting a light of either blue, green, yellow or red as a light source, and a rod lens array 278 serving as a lens unit. As illustrated in FIG. 8, the LEDs 376 are arranged in a straight line along the widthwise direction of the original 258 and the photosensitive material 262 in the order of blue, green, yellow and red (B1, G1, Y1, R1, B2, G2, Y2, R2 . . . Bn, Gn, Yn, Rn).

For this reason, light in which colors of blue, green, yellow and red are mixed substantially uniformly with each other is evenly irradiated along the widthwise direction of the original 258, so that an image plane of the original 258 can be scanned by moving the moving plate 252.

Further, the luminance of each LED 376 can be controlled. Thus, by controlling current, it is possible to strengthen or weaken a specific color when necessary.

In the fifth embodiment, a plurality of LEDs 376 of which the luminance each can be controlled are used as light sources. The rod lens array 278 is used as a lens unit. For this reason, it is no longer necessary to mount or remove a color filter, and provide a mechanism such as diaphragm, which was needed when a halogen lamp was used as the light source. Further, it suffices that only current to the LEDs 376 be controlled. Accordingly, a construction of the apparatus is simplified and the overall apparatus can be made small.

Further, since light from the plurality of LEDs emitting respective colors of BGYR is irradiated onto the original 258, the synthetic light colors of blue, green, yellow and red can be irradiated onto the original 258 and color reproducibility of the original onto the photosensitive material can be improved.

Further, the present apparatus is constructed mainly for the purpose of recording an image of an even magnification. For this reason, when LEDs 376, whose luminance can be easily controlled, are used, the rod lens array 278 can be used, and the apparatus can be made even smaller.

Meanwhile, in the fifth embodiment, the photosensitive material 262 is accommodated in the magazine 264 in the form of a roll. However, sheet-type photosensitive material can also be used.

Further, in the foregoing, the LEDs 376 are constructed so that the colors are arranged in a straight line in the order of blue, green, yellow and red. However, four LED arrays (blue light, green light, yellow light and red light) may also be disposed along a direction perpendicular to the widthwise direction of the photosensitive material 262.

In addition, the fifth embodiment is described in the case of the reflection original 258. However, when the transparency original 282 is used as illustrated in FIG. 6, it suffices that the transparency original 282 passes between the LED 376 and the rod lens array 278.

Referring again to FIG. 1, a schematic overall structural view of the image recording apparatus 310, is shown according to a sixth embodiment of the present invention.

The sixth embodiment shows an example in which the scanning/exposing system of the second embodiment is applied to an apparatus which exposes an image on a heat-developing photosensitive material and the image is transferred to an image receiving material by heat developing so as to form an image. It should be noted that the same components as those of the first embodiment will be denoted by the same reference numerals, and a description thereof will be omitted.

An exposure device 338 is disposed in a space between the exposure section 22 and the transparent glass plate 45. Disposed in the exposure device 338 are a light source 338A and a lens unit 338B, which function to form, on the photosensitive surface of the photosensitive material 16, the reflection image of the original 42 on the holding plate 12A which moves in synchronism with the conveyance of the photosensitive material 16.

The light source 338A is formed by two LED arrays 339 each with blue light LEDs, green light LEDs, yellow light LEDs and red light LEDs alternately arranged one by one in a straight line along the widthwise direction of the original 42. The luminance of each LED can be controlled. For this reason, it becomes unnecessary to provide a color filter and a diaphragm mechanism for controlling the quantity or quality of light on an optical path, and it becomes possible to effect controlling of the quantity or quality of light by controlling current.

The light source 338A is turned on in the exposure device 338. Since the luminance of each LED can be controlled independently, the lighting of the light source is controlled in accordance with the density of the original 42 used and the color balance of the photosensitive material 16.

Namely, even if a color filter or a diaphragm mechanism is not provided on an optical axis, it is possible to obtain optimum quantity and quality of light only by controlling current. As a result, the construction of the exposure device 338 becomes simple.

Further, since light whose waveband is set within a range from 450 to 650 nm is irradiated on the original 42 by using the blue light LEDs, green light LEDs, yellow light LEDs and red light LEDs which are arranged along the widthwise direction of the original, color reproducibility of the original 42 onto the photosensitive material 16 can be improved.

The photosensitive material which can be used in each of the above-described embodiments may be any photosensitive material in which a latent image obtained by exposing an image is subject to a predetermined development processing to obtain a visible image. Examples thereof includes a negative film, a reversal film, a color photographic photosensitive material such as a color printing paper, a color diffusion transfer photosensitive material, a color heat-developing photosensitive material, and a color photosensitive/pressure-sensitive material. When a positive original is used, a so-called positive-positive photosensitive material may be used for each of the above-described photosensitive materials, and when a positive original is recorded by using a negative original, a so-called negative-positive photosensitive material may be used.

What is claimed is:

1. An image recording apparatus comprising:

a light source which illuminates light to one of a reflection original image and a transparency original image; and an imaging lens system which uses light from the original image after being emitted from said light source to form an image on a photosensitive surface of a photosensitive material, wherein said light source has a plurality of light emitting diodes each of which emit light of one of a color of red, green and blue, and wherein light emitting diodes of the same color have a plurality of different peak wavelengths, and at least one of the same color light emitting diodes is selected in accordance with a spectral absorption of pigments of the original image.

2. An image recording apparatus according to claim 1, wherein a light emission time and a luminance of each of said plurality of semiconductor elements are adjustable independently for each of said plurality of semiconductor elements, and wherein said image recording apparatus further comprises control means for controlling a quantity of light of each color in accordance with a density of the original image and a color balance of the photosensitive material.

3. An image recording apparatus according to claim 1, wherein said plurality of light emitting diodes are provided so that adjacent light emitting diodes have different colors and are arranged in a straight line at regular intervals, and wherein said imaging lens system comprises a rod lens array.

4. An image recording apparatus comprising:

a light source which illuminates light to one of a reflection original image and a transparency original image; and an imaging lens system which uses light from the original image after being emitted from said light source to form an image on a photosensitive surface of a photosensitive material, wherein said light source has a plurality of light emitting diodes, each of which emit light of one of a color of red, green, blue and yellow, and wherein said plurality of light emitting diodes are respectively provided so that each light emitting diode of red emits light whose waveband is approximately 620 nm to 700 nm and whose central wavelength is about 660 nm, each light emitting diode of green emits light whose waveband is approximately 500 nm to 580 nm and whose central wavelength is about 540 nm, each light emitting diode of blue emits light whose waveband is approximately 420 nm to 580 nm and whose central wavelength is about 460 nm, and each light emitting diode of yellow emits light whose waveband is approximately 560 nm to 640 nm and whose central wavelength is about 600 nm.

5. An image recording apparatus according to claim 4, wherein a light emission time and a luminance of each of said plurality of semiconductor elements are adjustable for each of said plurality of semiconductor elements, and wherein said image recording apparatus further comprises control means for controlling a quantity of light of each color in accordance with a density of the original image and a color balance of the photosensitive material.

6. An image recording apparatus according to claim 4, wherein said plurality of light emitting diodes of each color of red, green, blue and yellow have a plurality of different peak wavelengths, and wherein said plurality of light emitting diodes of the respective colors are selected in accordance with a spectral absorption of pigments of the original image.

7. An image recording apparatus according to claim 4, wherein said plurality of light emitting diodes are provided so that adjacent light emitting diodes have different colors and are arranged in a straight line at regular intervals, and wherein said imaging lens system comprises a rod lens array.

8. An image recording apparatus comprising:

a light source which illuminates light to one of a reflection original image and an transparency original image; and an imaging lens system which uses light from the original image after being emitted from said light source to form an image on a photosensitive surface of a photosensitive material, wherein said light source has a plurality of light emitting diodes, each of which emit light of one of a color of red, green, blue and yellow, and wherein light emitting diodes of the same color have a plurality of different peak wavelengths, and at least one of the same color light emitting diodes is selected in accordance with a spectral absorption of pigments of the original image.

9. An image recording apparatus according to claim 8, wherein a light emission time and a luminance of each of said plurality of semiconductor elements are adjustable independently for each of said plurality of semiconductor elements, and wherein said image recording apparatus further comprises control means for controlling a quantity of light of each color in accordance with a density of the original image and a color balance of the photosensitive material.

10. An image recording apparatus according to claim 8, wherein said plurality of light emitting diodes are provided so that adjacent light emitting diodes have different colors and are arranged in a straight line at regular intervals, and wherein said imaging lens system comprises a rod lens array.

11. An image recording apparatus comprising:

a light source which illuminates light to one of a reflection original image and a transparent original image;

an imaging lens system which uses light from the original image after being emitted from said light source to form an image on a photosensitive surface of a photosensitive material, wherein said light source has a plurality of light emitting diodes which are respectively provided so that each light emitting diode of red emits light whose waveband is approximately 620 nm to 700 nm and whose central wavelength is about 660 nm, each light emitting diode of green emits light whose waveband is approximately 500 nm to 580 nm and whose central wavelength is about 540 nm, and each light emitting diode of blue emits light whose waveband is approximately 420 nm to 580 nm and whose central wavelength is about 460 nm.

12. An image recording apparatus according to claim 11, wherein a light emission time and a luminance of each of said plurality of semiconductor elements are adjustable independently for each of said plurality of semiconductor elements, and wherein said image recording apparatus further comprises control means for controlling a quantity of light of each color in accordance with a density of the original image and a color balance of the photosensitive material.

13. An image recording apparatus according to claim 11, wherein light emitting diodes of the same color have a plurality of different peak wavelengths, and at least one of the same color light emitting diodes is selected in accordance with a spectral absorption of pigments of the original image.

14. An image recording apparatus according to claim 11, wherein said plurality of light emitting diodes are provided so that adjacent light emitting diodes have different colors and are arranged in a straight line at regular intervals, and wherein said imaging lens system comprises a rod lens array.

* * * * *